(12) United States Patent
Kumar

(10) Patent No.: US 10,712,897 B2
(45) Date of Patent: Jul. 14, 2020

(54) DEVICE AND METHOD FOR ARRANGING CONTENTS DISPLAYED ON SCREEN

(71) Applicant: Samsung Electronics Co., Ltd., Suwon-si, Gyeonggi-do (KR)

(72) Inventor: Sumit Kumar, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 968 days.

(21) Appl. No.: 14/966,709

(22) Filed: Dec. 11, 2015

(65) Prior Publication Data
US 2016/0170584 A1    Jun. 16, 2016

(30) Foreign Application Priority Data

Dec. 12, 2014  (IN) ............................ 6290/CHE/2014
Nov. 17, 2015  (KR) ........................ 10-2015-0161050

(51) Int. Cl.
*G06F 3/00*     (2006.01)
*G06F 3/0481*   (2013.01)
(Continued)

(52) U.S. Cl.
CPC .......... *G06F 3/04812* (2013.01); *G06F 3/013* (2013.01); *G06F 3/0484* (2013.01); *G06F 3/04842* (2013.01); *G06F 2203/04803* (2013.01)

(58) Field of Classification Search
CPC .... G06F 3/04842; G06F 3/0482; G06F 3/013; G06F 3/017; G06F 3/04883; G06F 3/012; G06F 3/0485; G06F 2203/04803; G06F 3/04812; G06F 3/0488; G06F 2203/04806; G06F 3/011; G06F 3/0304; G06F 3/0346; G06F 3/0481; G06F 3/04817; G06F 15/16; G06F 19/00; G06F 19/3462;
(Continued)

(56) References Cited

U.S. PATENT DOCUMENTS 6,563,514 B1   5/2003 Samar
6,608,615 B1   8/2003 Martins
(Continued)

FOREIGN PATENT DOCUMENTS

WO    2014/061017 A1   4/2014
WO    2014/100683 A1   6/2014

OTHER PUBLICATIONS

S. Shrestha et al., "Eye Gaze Patterns while Searching vs. browsing a website", Jan. 14, 2007, pp. 1-7, Software Usability Research Lab.
(Continued)

*Primary Examiner* — Di Xiao
(74) *Attorney, Agent, or Firm* — Jefferson IP Law, LLP

(57) ABSTRACT

A method by which a device arranges contents displayed on a screen of the device is provided. The method includes detecting eyes of a user with respect to the screen of the device, generating preferred area information regarding a preferred area preferred by the user in an entirety of the screen of the device, based on the detected eyes of the user, selecting at least one of a plurality of contents displayed on the screen of the device, and rearranging the plurality of contents displayed on the screen of the device by changing displayed location of the selected at least one of the plurality of contents on the screen of the device.

43 Claims, 16 Drawing Sheets

(51) Int. Cl.
*G06F 3/01* (2006.01)
*G06F 3/0484* (2013.01)

(58) Field of Classification Search
CPC ............ G06F 19/3475; G06F 19/3481; G06F 2200/1637; G06F 3/014; G06F 3/016; G06F 3/0236; G06F 3/038; G06F 3/04815; G06F 3/0483; G06F 3/0484; G06F 3/04847; G06F 3/0487; G06F 3/04886; G06F 3/04892; G06F 3/165; G06F 9/451; G06F 17/30528; G06F 17/3056; G06F 17/30994; G06F 2203/04106; G06F 3/0425; G06F 3/167
See application file for complete search history.

(56) References Cited

U.S. PATENT DOCUMENTS

| 7,137,075 | B2* | 11/2006 | Hoshino | G06F 3/04815 715/848 |
|---|---|---|---|---|
| 8,375,305 | B1 | 2/2013 | Strand | |
| 2008/0282176 | A1 | 11/2008 | Bates et al. | |
| 2009/0158166 | A1 | 6/2009 | Dewar et al. | |
| 2010/0050128 | A1* | 2/2010 | Chiang | G06F 9/451 715/847 |
| 2010/0169792 | A1 | 7/2010 | Ascar et al. | |
| 2010/0205576 | A1* | 8/2010 | Majumder | G06F 17/5081 716/122 |
| 2010/0295774 | A1 | 11/2010 | Hennessey | |
| 2011/0242122 | A1* | 10/2011 | Bose | G06F 3/1462 345/545 |
| 2012/0229248 | A1* | 9/2012 | Parshionikar | G08B 21/06 340/3.1 |
| 2013/0163023 | A1* | 6/2013 | Tomono | H04N 1/00392 358/1.13 |
| 2013/0167055 | A1* | 6/2013 | Penev | G06F 3/0482 715/765 |
| 2013/0246926 | A1 | 9/2013 | Vemireddy | |
| 2014/0370949 | A1* | 12/2014 | Beppu | A63F 13/2145 463/9 |
| 2015/0089381 | A1* | 3/2015 | Shao | G06F 3/013 715/740 |
| 2015/0135132 | A1* | 5/2015 | Josephson | G06F 3/0482 715/784 |

OTHER PUBLICATIONS

David Beymer et al., "WebGazeAnalyzer: A System for capturing and analyzing, Web reading behavior using eye gaze", 2005, pp. 1-10.

Indian Office Action dated Nov. 18, 2019, issued in Indian Patent Application No. 6290/CHE/2014.

* cited by examiner

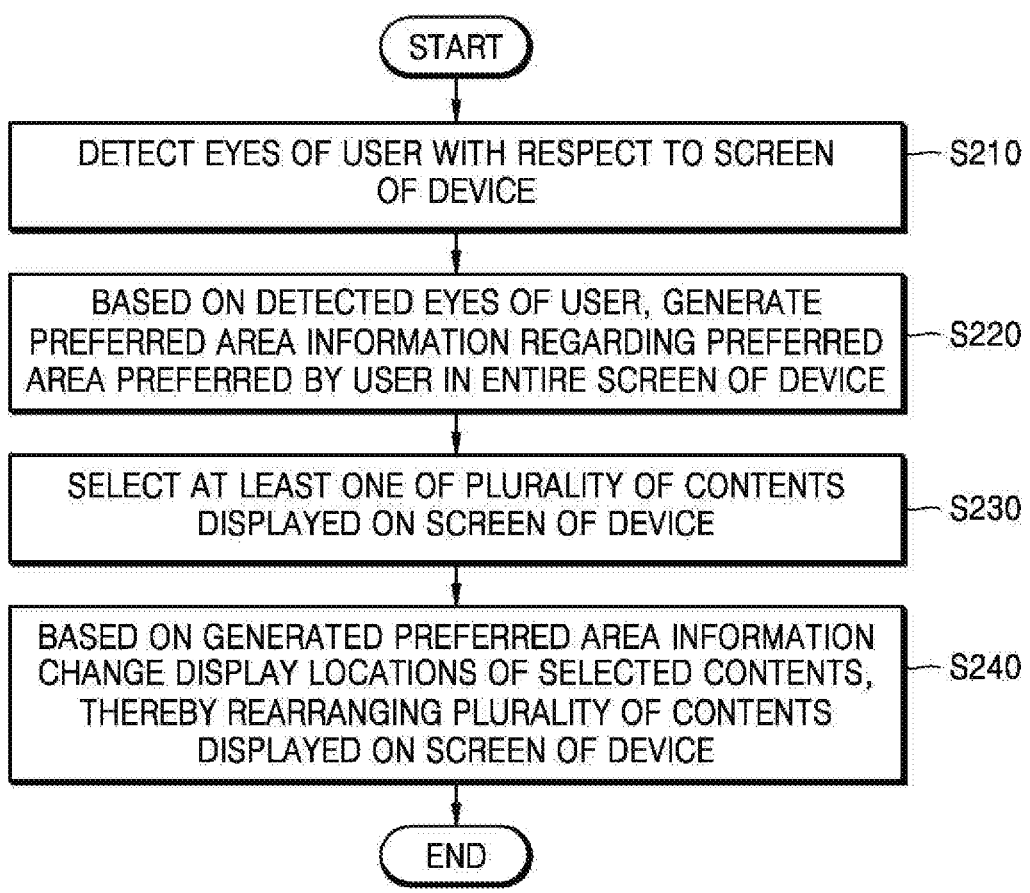

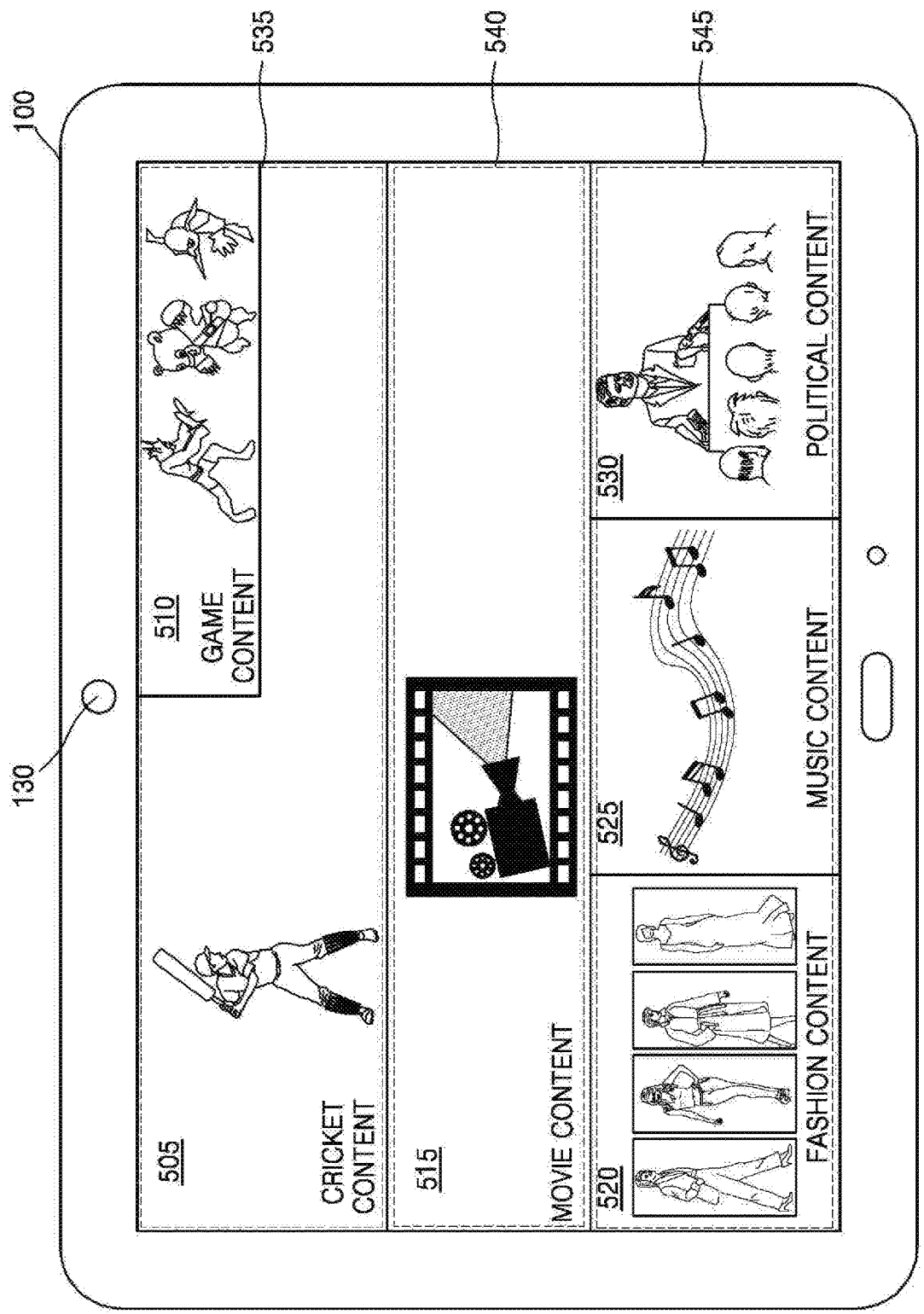

DEVICE AND METHOD FOR ARRANGING CONTENTS DISPLAYED ON SCREEN

CROSS-REFERENCE TO RELATED APPLICATION(S)

This application claims the benefit under 35 U.S.C. § 119(a) of an Indian patent application filed on Dec. 12, 2014 in the Indian Patent Office and assigned Serial number 6290/CHE/2014, and of a Korean patent application filed on Nov. 17, 2015 in the Korean Intellectual Property Office and assigned Serial number 10-2015-0161050, the entirety of each of which is hereby incorporated by reference.

TECHNICAL FIELD

Various embodiments relate to a device and a method for arranging contents displayed on a screen. More particularly, various embodiments relates to a device and a method for arranging contents displayed on a screen based on detected information regarding a user using the device.

BACKGROUND

The internet enables a user to search for a massive amount of contents and obtain information. Therefore, a user may search for a massive amount of contents via a device. A web browser of a device may display contents in the form of a web page according to a layout of a web page, and a web page may display various contents that are shown to the user in user-readable formats.

A device in the related art provides a fixed screen image for displaying contents. In fixed web page layouts, contents may be displayed at pre-set areas of a display screen. Furthermore, contents displayed in a web page may include relevant contents and irrelevant contents.

A device in the related art is not able to efficiently arrange contents according to relevance between user information and contents. Furthermore, a device in the related art is not able to efficiently display contents highly interested by a user at a display area frequently viewed by the user.

Therefore, it takes a user a long time to find desired content on a display screen and the user may fail to recognize some contents due to fixed content arrangements.

Therefore, there is a demand for a technique for dynamically rearranging contents on a display screen of a device.

The above information is presented as background information only to assist with an understanding of various embodiments. No determination has been made, and no assertion is made, as to whether any of the above might be applicable as prior art with regard to various embodiments.

SUMMARY

Aspects of various embodiments are to address at least the above-mentioned problems and/or disadvantages and to provide at least the advantages described below. Accordingly, an aspect of various embodiments is to provide a method by which a device rearranges contents displayed on the screen of the device.

In accordance with an aspect of various embodiments, a method by which a device arranges contents displayed on a screen of the device is provided. The method includes detecting eyes of a user with respect to the screen of the device, generating preferred area information regarding a preferred area preferred by the user in an entirety of the screen of the device, based on the detected eyes of the user, selecting at least one of a plurality of contents displayed on the screen of the device, and rearranging the plurality of contents displayed on the screen of the device by changing displayed location of the selected at least one of the plurality of contents on the screen of the device.

In the selecting of the at least one of the plurality of contents, at least one of the plurality of contents to be recommended to the user may be selected based on information regarding a history of the user of using contents.

The information regarding the history of the user of using contents may include at least one of a number of times that each user viewed respective contents, periods of time that each user viewed the respective contents, and frequencies of using the respective contents that each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents.

The information regarding the history of the user of using contents may include information regarding a face expression and a body position of the user while the user is viewing contents, and, in the selecting of the at least one of the plurality of contents, the at least one of the plurality of contents may be selected based on a face expression and a body position of the user viewing contents.

In the selecting of the at least one of the plurality of contents, at least one of the plurality of contents to be recommended to the user may be selected based on at least one of content property information regarding the content, user property information regarding the user, and information regarding a history of the user of using contents.

The content property information may include information regarding types and genres of contents viewed by the user, and, in the selecting of the at least one of the plurality of contents, the at least one of the plurality of contents may be selected based on types and genres of contents viewed by the user.

The user property information may include a user authorization regarding the contents and a location of the user, and, in the selecting of the at least one of the plurality of contents, the at least one of the plurality of contents may be selected based on an authorization by the user for using contents and a location of the user.

The preferred area information may include at least one of size, shape, location, and priority of the preferred area.

The preferred area information may be generated based on at least one of a moving route of the detected eyes of the user, a time period that the eyes of the user are detected, and a number of times that the eyes of the user are detected.

The preferred area may be set by the user.

The rearranging of the plurality of contents may include determining priorities of the plurality of contents displayed on the screen of the device, selecting content from among the plurality of contents based on the preferred area information and the priorities of the plurality of contents, and changing location of the selected content.

In the changing of the location of the selected content, the selected content may be moved to the preferred area, and, if unselected content from among the plurality of contents is located in the preferred area, the unselected content may be moved to an area of the screen of the device other than the preferred area.

The rearranging of the plurality of contents may include removing at least some of unselected contents from among the plurality of contents from the screen of the device.

In the rearranging of the plurality of contents, a display shape of the selected at least one of the plurality of contents may be changed based on the preferred area information.

The rearranging of the plurality of contents may further include obtaining at least one new content, determining locations for arranging the selected content and the at least one new content based on the preferred area information, and rearranging the selected content and the at least one new content at the determined locations.

The rearranging of the plurality of contents may further include determining priorities of the plurality of contents, replacing at least some of the plurality of contents with the new contents based on the determined priorities, and, if a priority of the content is lower than or equal to a pre-set ranking, replacing the content having a priority lower than or equal to the pre-set ranking with new content.

The method may further include changing a background color of the preferred area based on the preferred area information.

In the detecting of the eyes of the user, the eyes of the user may be detected based on at least one of an expansion state of pupils of the user, a direction viewed by the eyes of the user, existence of the eyes of the user, and a retinal pattern of the user.

The detecting of the eyes of the user may include displaying a cursor corresponding to the eyes of the user on the screen of the device, and displaying a moving route of the cursor that is changed as the eyes of the user move.

The method may further include changing a background color of content intersecting with the moving route of the cursor.

The content may include at least one of texts, hyperlinks, images, icons, user interfaces (UIs), audio files, video files, advertisements, and web page objects.

According to various embodiments, a non-transitory computer readable recording medium having recorded thereon a computer program for, when executed by at least one processor, implementing any one of the above methods is provided.

In accordance with various embodiments, a device for arranging contents displayed on the screen of the device is provided. The device includes a detector configured to detect eyes of a user with respect to the screen of the device, a display configured to display a plurality of contents, and a processor configured to generate preferred area information regarding a preferred area preferred by the user in an entirety of the screen of the device, based on the detected eyes of the user, may select at least one of a plurality of contents displayed on the screen of the device, and rearrange the plurality of contents displayed on the screen of the device by changing displayed location of the selected at least one of the plurality of contents on the screen of the device.

The processor may be configured to select at least one of the plurality of contents to be recommended to the user may be selected based on information regarding a history of the user of using contents.

The information regarding the history of the user of using contents may include at least one of a number of times that each user viewed respective contents, periods of time that each user viewed the respective contents, and frequencies of using the respective contents that each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents The information regarding the history of the user of using contents may include information regarding a face expression and a body position of the user while the user is viewing contents, and, the processor maybe configured to select the at least one of the plurality of contents based on a face expression and a body position of the user viewing contents.

The processor may be configured to select the at least one of the plurality of contents to be recommended to the user based on at least one of content property information regarding the content, user property information regarding the user, and information regarding a history of the user of using contents.

The content property information may include information regarding types and genres of contents viewed by the user, and the processor may be configured to select the at least one of the plurality of contents based on types and genres of contents viewed by the user.

The user property information may include a user authorization regarding the contents and a location of the user, and the processor may be configured to select the at least one of the plurality of contents based on an authorization by the user for using contents and a location of the user.

The preferred area information may include at least one of size, shape, location, and priority of the preferred area.

The preferred area information may be generated based on at least one of a moving route of the detected eyes of the user, a time period that the eyes of the user are detected, and a number of times that the eyes of the user are detected.

The preferred area may be set by the user.

The processor may be configured to determine priorities of the plurality of contents displayed on the screen of the device, select content from among the plurality of contents based on the preferred area information and the priorities of the plurality of contents, and change location of the selected content.

To change the location of the selected content, the processor may be configured to move the selected content to the preferred area, and, if unselected content from among the plurality of contents is located in the preferred area, the processor may be configured to move the unselected content to an area of the screen of the device other than the preferred area.

The processor may be configured to remove at least some of unselected contents from among the plurality of contents from the screen of the device.

The processor may be configured to change display shape of the selected content based on the preferred area information.

The processor may be configured to obtain at least one new content, determine locations for arranging the selected content and the at least one new content based on the preferred area information, and rearrange the selected content and the at least one new content at the determined locations.

The processor may be configured to determine priorities of the plurality of contents, replace at least some of the plurality of contents with the at least one new content based on the determined priorities, and, if a priority of the content is lower than or equal to a pre-set ranking, replace the content having a priority lower than or equal to the pre-set ranking with new content.

The processor may be configured to change a background color of the preferred area based on the preferred area information.

The processor may be configured to detect eyes of the user based on at least one of expansion state of pupils of the user, a direction viewed by eyes of the user, existence of eyes of the user, and a retinal pattern of the user.

The processor may be configured to display a cursor corresponding to eyes of the user on the screen of the device and displays a moving route of the cursor that is changed as eyes of the user move.

The processor may be configured to change a background color of content intersecting with the moving route of the cursor.

The content may include at least one of texts, hyperlinks, images, icons, UIs, audio files, video files, advertisements, and web page objects.

Other aspects, advantages, and salient features of various embodiments will become apparent to those skilled in the art from the following detailed description, which, taken in conjunction with the annexed drawings, discloses various embodiments.

BRIEF DESCRIPTION OF THE DRAWINGS

The above and other aspects, features, and advantages of various embodiments will be more apparent from the following description taken in conjunction with the accompanying drawings, in which:

FIG. 2 is a flowchart showing a method of rearranging content displayed on the screen of the device according to various embodiments;

FIGS. 5A and 5B are diagrams showing that a plurality of contents are rearranged on the screen of the device according to various embodiments;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of various embodiments. In addition, descriptions of well-known functions and constructions may be omitted for clarity and conciseness.

The terms and words used in the following description and claims are not limited to the bibliographical meanings, but, are merely used by the inventor to enable a clear and consistent understanding of various embodiments. Accordingly, it should be apparent to those skilled in the art that the following description of various embodiments is provided for illustration purpose only and not for the purpose of limiting various embodiments as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Figure 1:
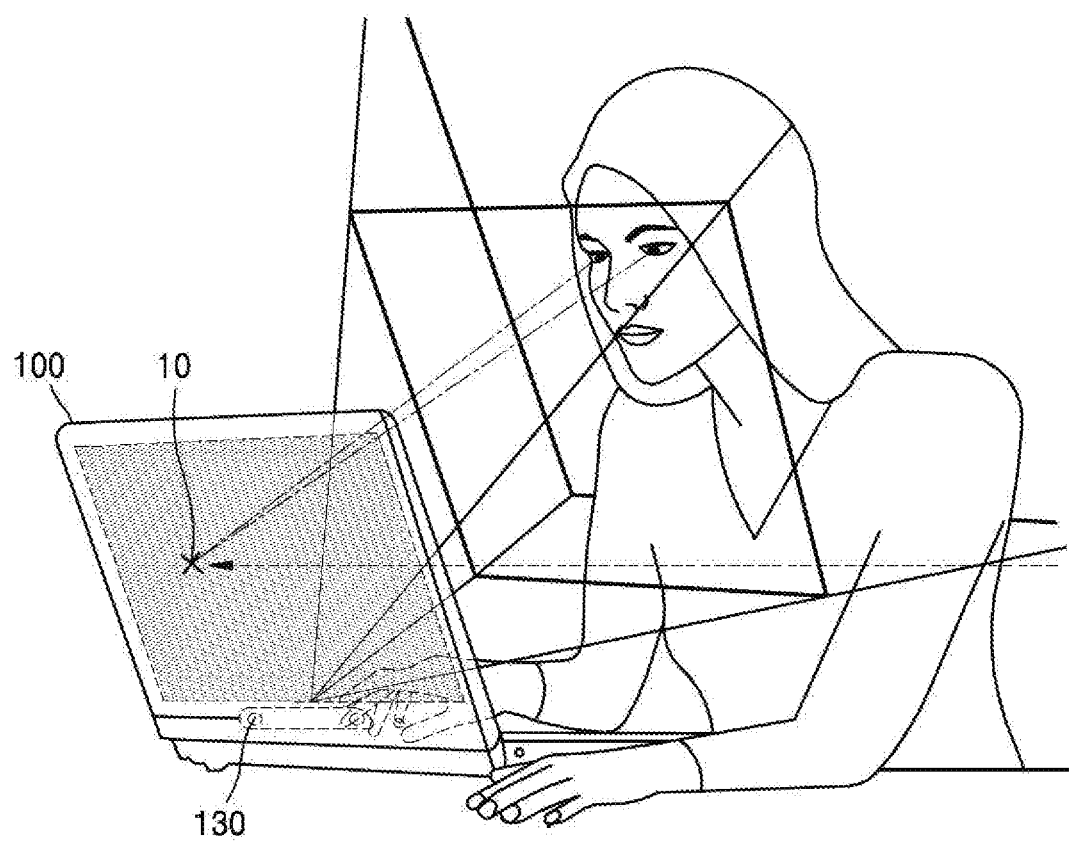
FIG. 1 is a schematic diagram for describing a device for rearranging contents displayed on a screen according to various embodiments.

FIG. 1 is a schematic diagram for describing a device for rearranging contents displayed on a screen according to various embodiments.

Referring to FIG. 1, a device 100 may arrange contents displayed on a screen of the device 100 based on eyes of a user. The device 100 may be a laptop computer, for example. However, it is merely an example, and the device 100 may be any of various electronic devices including a display. For example, the device 100 may be a television (TV), a tablet personal computer (PC), a digital camera, a camcorder, a mobile terminal, a desktop PC, an e-book terminal, a digital broadcasting terminal, a personal digital assistant (PDA), a portable multimedia player (PMP), a navigation device, a Moving Picture Experts Group phase 1 or phase 2 (MPEG-1 or MPEG-2) audio layer 3 (MP3) player, a wearable device, or any of various other electronic devices. Furthermore, the device 100 may be a stationary device or a mobile device.

As shown in FIG. 1, the device 100 may detect eyes of a user with respect to the screen of the device 100. The device 100 may determine a viewpoint 10 corresponding to the eyes of the user viewing the screen of the device 100. Furthermore, the device 100 may display the viewpoint 10 on the screen.

The device 100 may generate preference area information regarding an area preferred by the user from the entire screen area of the device 100.

A preferred area may refer to an area preferred by a user in the entire screen area of the device 100. Furthermore, a preferred area may refer to an area frequently viewed by a user in the entire screen area of the device 100. A preferred area may be an upper portion, a lower portion, a center portion, or a side portion of the screen of the device 100, but is not limited thereto. Furthermore, a preferred area of the screen of the device 100 may be changed.

Furthermore, a preferred area may be a partial area of the entire screen of the device 100 or may be the entire screen of the device 100. Here, a number of the partial areas is not limited.

The device 100 may select at least one of a plurality of contents displayed on the screen of the device 100. Here, the selected content may be content to be rearranged on the screen as the device 100 detects eyes of a user. For example, the selected content may be content interested by a user. The content interested by the user may be selected to be moved to the user's most preferred area. According to an embodiment, the device 100 may move the selected content to the user's most preferred area.

The device 100 changes a location for displaying the selected content based on generated preferred area information, thereby rearranging a plurality of contents displayed on the screen of the device 100.

In other words, the device 100 may determine respective preferred areas for locating a plurality of contents and rearrange the contents in the corresponding preferred areas.

Therefore, the device 100 may rearrange contents displayed on the screen of the device 100 based on eyes of a user viewing the contents displayed on the screen of the device 100. Therefore, the device 100 may display contents interested by the user in a preferred area, and thus the user may conveniently view contents displayed in the preferred area.

FIG. 2 is a flowchart showing a method of rearranging content displayed on the screen of the device 100 according to various embodiments.

Referring to FIG. 2, the device 100 may increase convenience of a user for viewing contents displayed on the screen of the device 100 by rearranging the contents according to preferences of the user.

In operation S210, the device 100 may detect eyes of a user with respect to the screen of the device 100. The device 100 may detect eyes of the user by using a camera or a light detector.

Here, the device 100 may recognize eyes of the user by using a camera and track eyes of the user. The device 100 may monitor the user viewing the screen of the device 100 by using the camera. Examples of the camera according to various embodiments may include at least one of a web camera, a mobile phone camera, and a digital single-lens reflex (DSLR) camera. However, various embodiments are not limited thereto. The device 100 may monitor a viewing pattern of the user by tracking various characteristics of the user's behaviors. Examples of a user's viewing patterns that may be recognized by the camera according to various embodiments may include at least one of eyes, face expressions, emotions, existence of eyes, locations of eyes, an eye-blinking rate, a retinal pattern, and a pupil expansion, but is not limited thereto.

In operation S220, the device 100 may generate preferred area information regarding a preferred area preferred by the user in the entire screen of the device 100 based on the detected eyes of the user.

The device 100 may generate preferred area information regarding a preferred area preferred by the user based on a number of times that eyes of the user viewed an area of the screen, a period of time that eyes of the user viewed an area of the screen, and a frequency that eyes of the user viewed an area of the screen. Preferred area information may indicate an area that is most frequently viewed by the user in the screen of the device 100. Preferred area information may vary from one user to another. Preferred area information may be generated in real time. Preferred area information may be transmitted to a server and stored therein. The preferred area information may be stored in a storage apparatus in the device 100.

The device 100 may count a number of times that eyes of the user are detected at the screen of the device 100. The preferred area may be determined based on an area of the screen of the device 100 that is most likely be viewed by the user.

According to various embodiments, the device 100 may count a number of times that eyes of the user are detected at respective areas of the screen of the device 100. The device 100 may determine priorities of areas in the screen of the device 100 based on numbers of times that eyes of the user are detected at the respective areas. An area with the highest priority may refer to an area that is most frequently viewed by the user, but is not limited thereto. Priorities of areas of the screen of the device 100 that are not viewed by the user may be low. According to an embodiment, a preferred area is an area frequently viewed by a user, where the preferred area may include not only an upper area, but also a center area, a left area, a right area, and a lower area. Furthermore, a preferred area may include a highlighted area indicating unread state of contents displayed on the screen.

In operation S230, the device 100 may select at least one of a plurality of contents displayed on the screen of the device 100. The device 100 may select content to be rearranged from among the plurality of contents. The device 100 may select all of the plurality of contents.

The device 100 may select contents based on information regarding the user's history of using contents. The device 100 may select contents based on numbers of times that the user viewed respective contents, periods of times that the user viewed the respective contents, and frequencies of using the respective contents.

The device 100 may select contents preferred by the user based on pre-set criteria. Content may be selected to be moved to a preferred area for preferred contents or a preferred area for less preferred contents.

Information regarding history of using contents may include information regarding at least one of numbers of times that each user viewed respective contents, periods of times that each user viewed the respective contents, and frequencies of using the respective contents, each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents.

For example, if a detected number of times that a user viewed a particular content is equal to or greater than a pre-set number of times, the device 100 may determine that the user is interested in the particular content. Therefore, the device 100 may set the particular content as content interested by the user. If the particular content is not located in an area preferred by the user, the device 100 may select the particular content to rearrange the particular content to the area preferred by the user.

In another example, the device 100 may measure a time period that a user viewed a particular content. If a detected time period that the user viewed the particular content exceeds a pre-set time period, the device 100 may set the particular content as content interested by the user. If the particular content is not located in an area preferred by the user, the device 100 may select the particular content to rearrange the particular content to the area preferred by the user.

Furthermore, the device 100 may select content to rearrange by using content property information or user property information regarding a user.

Here, content property information may include information regarding types and genres of contents viewed by a user. The device 100 may select content based on types and genres of contents viewed by the user.

For example, if contents frequently viewed by a user are sport contents, the device 100 may set sport contents as contents interested by the user. The device 100 may select sport content from among a plurality of contents and move the sport content to a preferred area. The device 100 may store the sport content as preferred content.

In another example, the device 100 may select content based on a genre of the content. For example, if contents interested by the user belong to a particular genre of movie contents, the device 100 may select movie contents of the particular genre to rearrange contents.

User property information may include a user authorization regarding contents and a location of the user. The device 100 may select content based on a user authorization and a location of the user.

For example, the device 100 may select content based on a user authorization of a user. If a user is not authorized to use a particular content, the device 100 may not select the particular content. The device 100 may select content from among contents that the user is authorized to use.

Furthermore, the device 100 may select content based on a location of a user. For example, if a location of a user is recognized as a "company," the device 100 may select contents that are frequently used at a company. Furthermore, the device 100 may map selected contents to a company and store a mapping result in the device 100 or a server.

In operation S240, the device 100 may rearrange contents displayed on the screen of the device 100 by changing locations for displaying selected contents based on generated preferred area information.

For example, the device 100 may move contents highly preferred by a user to a preferred area that is frequently viewed by the user. Furthermore, the device 100 may move contents less preferred by the user to an area that is not frequently viewed by the user. The preferred area frequently viewed by the user may be determined based on eyes of the user.

Figure 3A:
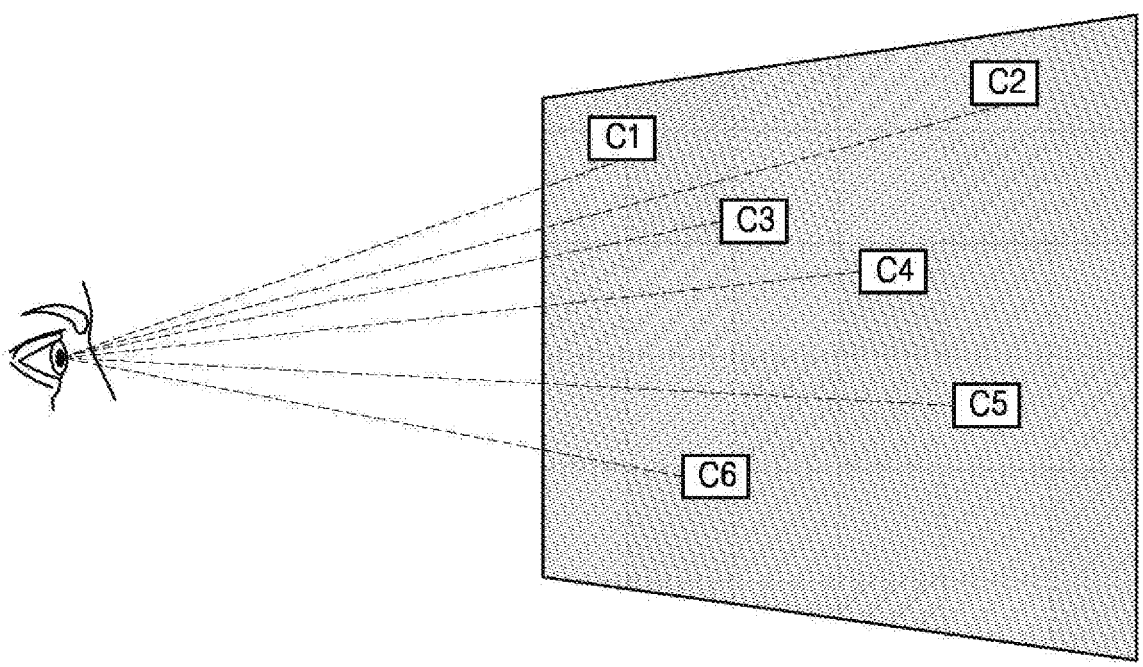
FIGS. 3A and 3B are diagrams showing that a device rearranges contents according to various embodiments.
Figure 3B:
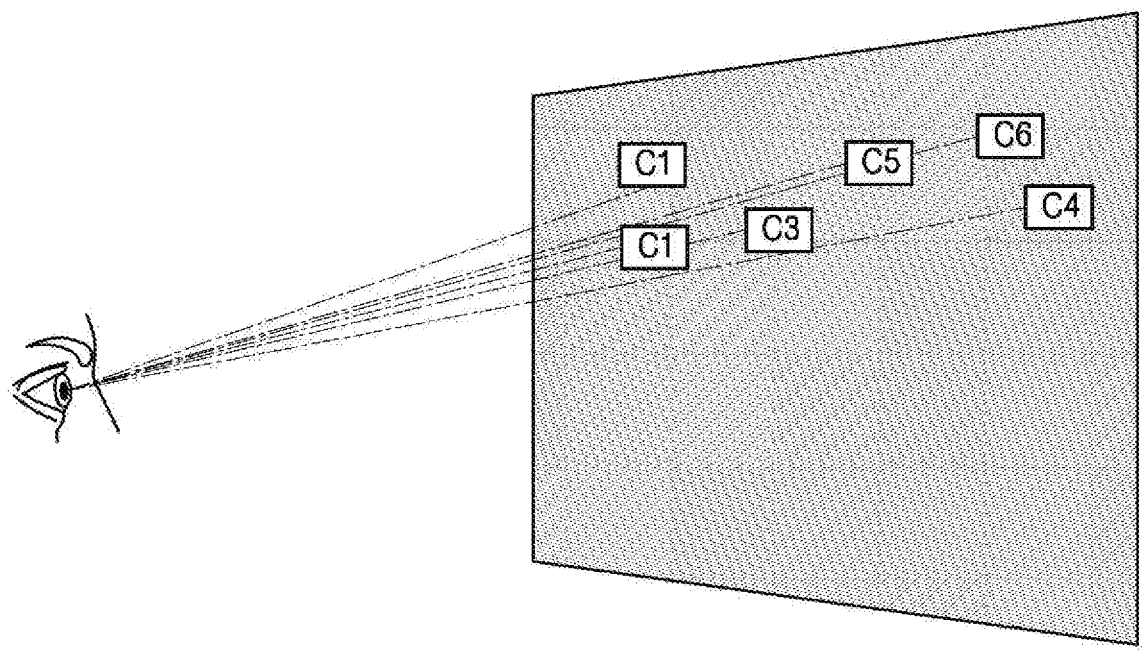

FIGS. 3A and 3B are diagrams showing that a device rearranges contents according to various embodiments.

FIG. 3A is a diagram showing that the device 100 displays a plurality of contents on the screen of the device 100.

Referring to FIG. 3A, the device 100 may display a plurality of contents according to initial rules set by the device 100. Here, the device 100 may display the contents without considering preferred area information based on eyes of a user.

The device 100 may detect eyes of a user viewing contents. The device 100 may generate a list of priorities of contents c1 to c6 based on numbers of times that the respective contents c1 to c6 are viewed by eyes of the user, time periods that eyes of the user are recognized, and pupil expansions of the user. Based on an analysis of detection of eyes of the user, the device 100 may set the contents c1, c3, c4, and c5 as contents preferred by the user. The device 100 may select the contents c1, c3, c4, and c5 to move the contents c1, c3, c4, and c5 to an area preferred by the user.

Furthermore, the device 100 may set an area preferred by the user. The device 100 may set a display area viewed by eyes of the user. In FIG. 3A, the device 100 may set an upper area of the entire screen of the device 100 as a preferred area frequently viewed by eyes of the user.

Referring to FIG. 3B, the device 100 may move contents preferred by the user to the area preferred by the user. In FIG. 3B, the device 100 may move selected contents to the upper display area that is set as the area preferred by the user.

For example, in FIG. 3B, the device 100 may move the selected contents c1, c3, c4, and c5, such that the selected contents c1, c3, c4, and c5 are located at the upper area of the entire screen of the device 100. FIG. 3B shows that the contents preferred by the user are located at the area preferred by the user.

Furthermore, the device 100 may add contents related to contents preferred by the user. The device 100 may determine contents preferred by the user by analyzing eyes of the user. For example, if eyes of the user are detected at a particular content for a number of times equal to or greater than a pre-set number of times, the device 100 may set a high priority to the particular content. The device 100 may add contents related to the particular content having a high priority to the area preferred by the user. As shown in FIG. 3B, the device 100 may determine the content c1 as content having a high priority regarding the user. During rearrangement of the plurality of contents c1 to c6, the device 100 may add the content c1 related to contents interested by the user at high priorities and rearrange the contents. Alternatively, the device 100 may remove the content c2, add the content c1, and rearrange the contents.

In other words, the device 100 may rearrange contents based on preference of the user at an area set as a preferred area for contents having high priorities in the screen of the device 100. The device 100 may enable the user to easily recognize contents preferred by the user.

Figure 4:
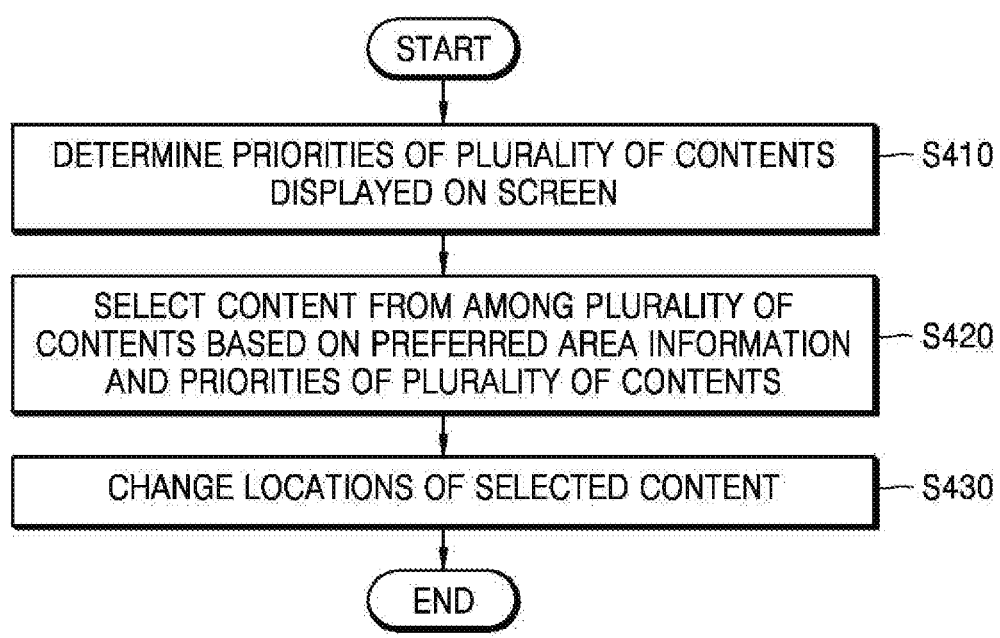
FIG. 4 is a flowchart showing a method by which the device selects contents according to various embodiments.

FIG. 4 is a flowchart showing a method by which the device 100 selects contents according to various embodiments.

Referring to FIG. 4, the device 100 may select contents preferred by a user to rearrange a plurality of contents.

In operation S410, the device 100 may determine priorities of a plurality of contents displayed on the screen of the device 100.

The device 100 may select contents to be relocated based on information regarding the user's history of using contents. Furthermore, the device 100 may select contents to be recommended to the user based on the information regarding the user's history of using contents.

Here, the information regarding a history of using contents may include information regarding at least one of numbers of times that each user viewed respective contents, periods of times that each user viewed the respective contents, and frequencies of using the respective contents, each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents.

Furthermore, content property information may include information regarding a face expression and a body position of the user while the user is viewing contents. The device 100 may select contents based on a face expression and a body position of the user viewing the contents.

According to various embodiments, the device 100 may rearrange contents displayed on the screen of the device 100 based on a change of body positions of the user. The device 100 may determine a body position of the user based on a distance from the screen of the device 100 to the face of the user. The device 100 may rearrange contents based on the determined body position of the user. Furthermore, the device 100 may change properties of contents, e.g., locations of the contents, a direction in which the contents are displayed, displayed sizes of the contents, colors of the contents, font sizes of texts included in the contents, colors of the texts, etc.

According to various embodiments, the device 100 may rearranged contents displayed on the screen of the device 100 based on a face expression of the user. The device 100 may determine a face expression of the user by recognizing the face of the user. The device 100 may determine an emotional state of the user based on the determined face expression of the user. For example, emotional states may include happiness, sadness, surprise, fear, sickness, and fury, but are not limited thereto. The device 100 may recommend contents based on an emotional state of the user.

For example, the device 100 may analyze eyes of the user and determine that content interested by the user is an image file related to humor. The device 100 may determine that an emotional state of the user is "happiness" or "joy" based on eyes of the user detected at the image file. The device 100 may recommend contents related to "joy" and "happiness" based on the emotional state of the user. The device 100 may select recommended contents and move the recommended contents to the area preferred by the user. Furthermore, the device 100 may obtain new contents and arrange the new contents in the area preferred by the user.

Furthermore, the device 100 may determine priorities of contents to select contents. For example, the device 100 may determine priorities of contents by analyzing numbers of times and time periods that the user viewed the respective contents. For example, the device 100 may determine contents not viewed by eyes of the user and contents viewed by eyes of the user for numbers of times equal to or greater than a pre-set number of times from among a plurality of contents arranged on the entire screen of the device 100. The device 100 may determine priorities of the plurality of contents.

In operation S420, the device 100 may select contents from the plurality of contents based on preferred area information and the priorities of the plurality of contents. Here, the device 100 may select contents to rearrange the contents based on the priorities of the plurality of contents. For example, if particular content having a high priority is not located at a preferred area having a high priority, the device 100 may select the particular content to move the particular content. On the contrary, if particular content having a low priority is located at a preferred area having a low priority, the device 100 may not select the particular content.

In other words, the device 100 may select contents to rearrange the contents, such that contents interested by the user match a preferred area.

In operation S430, the device 100 may change locations of the selected contents. The device 100 may change locations of the selected contents to rearrange contents based on preferred area information regarding the user.

Here, the preferred area information may be set by the user. The user may set an area preferred by the user in the entire screen of the device 100 in advance. The device 100 may receive an input regarding a preferred area from the user and update the preferred area information.

Preferred area information may be generated based on at least one of a route of detected eyes of the user, time periods that eyes of the user are detected, and numbers of times that eyes of the user are detected.

Furthermore, preferred area information may include information regarding at least one of a size, a shape, a location, and a priority of the preferred area.

To change locations of contents, the device 100 may remove at least some of unselected contents of a plurality of contents from the screen of the device 100. For example, if content having a low priority is located at a preferred area having a high priority in the screen of the device 100, the device 100 may remove the content having a low priority from the screen of the device 100. The device 100 may move content with a high priority to the preferred area in which the removed content was located. Alternatively, the device 100 may add new content and rearrange contents.

According to various embodiments, the device 100 may move selected content to a preferred area having a high priority and move unselected contents to display areas other than the preferred area having a high priority simultaneously. The device 100 may replace contents according to priorities of preferred areas.

Figure 5B:
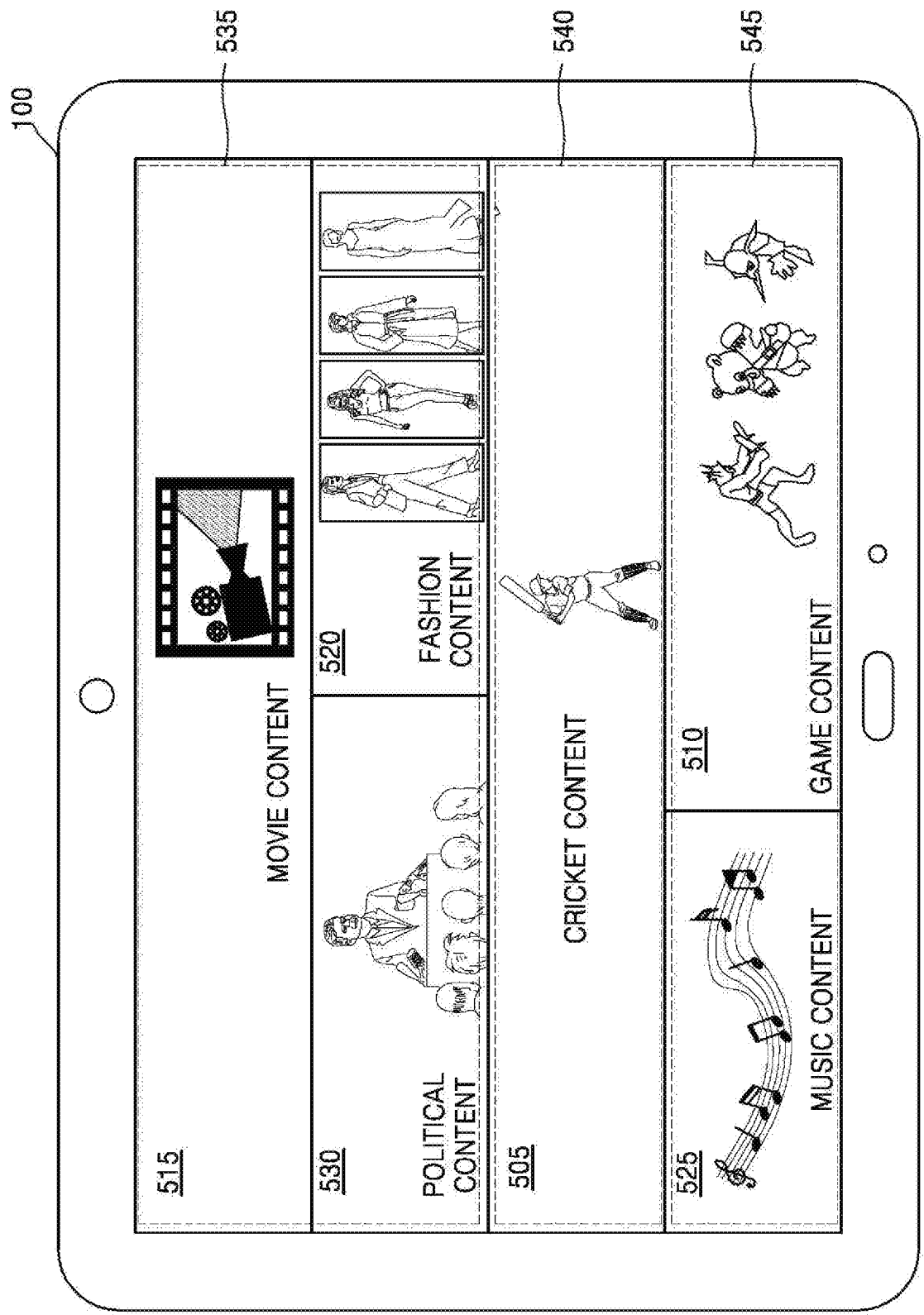

FIGS. 5A and 5B are diagrams showing that a plurality of contents are rearranged on the screen of the device 100 according to various embodiments.

FIG. 5A is a diagram showing the screen of the device 100 before the device 100 rearranges the plurality of contents.

Referring to FIG. 5A, the device 100 may display a cricket content 505, a game content 510, a movie content 515, a fashion content 520, a music content 525, and a political content 530 on the screen of the device 100.

Furthermore, the device 100 may generate preferred area information based on eyes of a user. For example, in FIG. 5A, an upper area 535, a center area 540, and a lower area 545 are set as preferred areas based on eyes of a user. The device 100 may determine priorities of the preferred areas based on eyes of the user. For example, priorities of the preferred areas may be in the order of the upper area 535, the center area 540, and the lower area 545.

The device 100 may select contents to be relocated from among a plurality of contents based on information regarding the user's history of using contents. According to various embodiments, the device 100 may determine priorities of the plurality of contents based on the user's preferences.

The device 100 may determine priorities of contents based on categories of the contents. For example, priorities of the contents may be in the order of the movie content 515, the political content 530, the fashion content 520, the music content 525, and the game content 510.

FIG. 5B is a diagram showing the screen of the device 100 after the device 100 rearranged contents based on preferred area information and priorities of the contents.

Referring to FIG. 5B, the device 100 may content the movie content 515, the political content 530, and the fashion content 520 having high priorities at the upper area 535 having a high priority, based on the preferred area information. Here, the device 100 may change sizes and shapes of contents to be arranged based on properties of the upper area 535 including a size and a shape of the upper area 535.

Furthermore, the device 100 may arrange the cricket content 505 to be located at the center area 540 based on the preferred area information and the priorities of the contents.

Furthermore, the device 100 may arrange the music content 525 and the game content 510 having relatively low priorities to be located at the lower area 545 of the screen of the device 100.

Accordingly, the device 100 may provide a screen image including contents arranged based on a user's preferences by suitably rearranging a plurality of contents based on preferred area information regarding the screen of the device 100. Therefore, the device 100 may efficiently arrange contents. Furthermore, the device 100 may provide an effect that contents highly preferred by a user are read by the user without being omitted.

Figure 6:
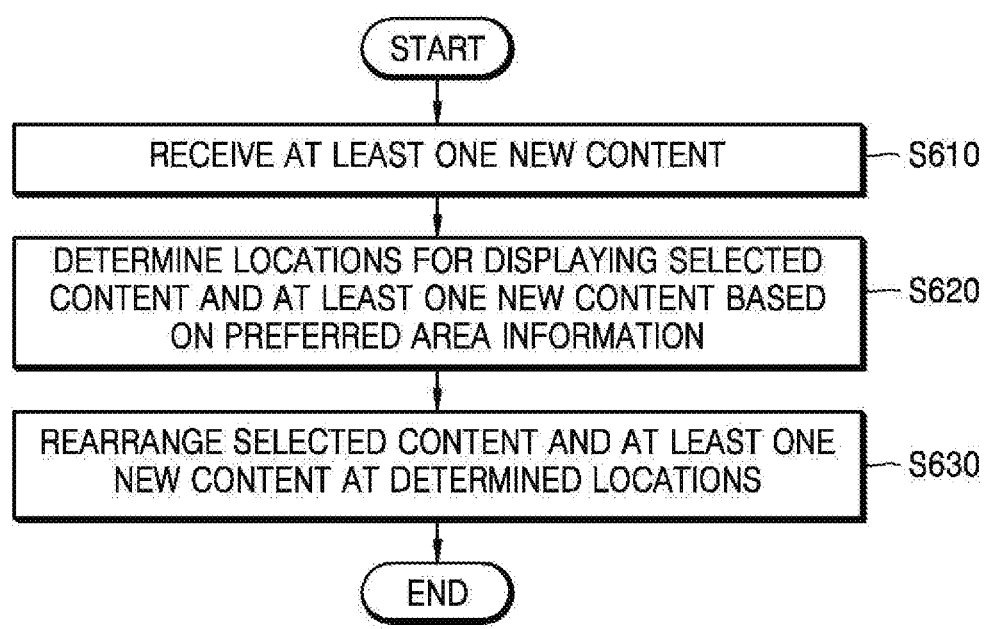
FIG. 6 is a flowchart showing a method of rearranging contents when new content is added according to various embodiments.

FIG. 6 is a flowchart showing a method of rearranging contents when new content is added according to various embodiments.

Referring to FIG. 6, newly added content may be arranged according to preferences according to various embodiments.

In operation S610, the device 100 may receive at least one new content. The new content may be selected based on at least one of information regarding a user's history of using contents, user property information regarding the user, and content property information regarding contents.

New content may refer to content added to a new screen image displayed as a screen image is scrolled as eyes of a user move.

According to various embodiments, the device 100 may allow a user to move a scroll bar on the screen of the device 100 by moving eyes of the user. For example, the device 100 may move a scroll bar of a web page based on locations viewed by eyes of a user. Furthermore, the device 100 may adjust locations viewed by eyes of a user on a screen image in which a web page is displayed. The device 100 may adjust web page scrolling based on movements of eyes of a user and locations viewed by eyes of the user.

New content may include content added based on an input of a user. Furthermore, the device 100 may analyze eyes of a user, recommend new content, and additionally display the new content on the screen of the device 100.

In operation S620, the device 100 may determine locations to arrange selected content and at least one new content based on preferred area information.

The device 100 may determine location information regarding contents already displayed on the screen of the device 100 and new content. The device 100 may determine locations of contents based on preferred area information determined based on eyes of a user.

According to various embodiments, the device 100 may continuously track and analyze areas of the screen of the device 100 viewed by eyes of a user while the user is browsing web pages. The device 100 may determine eye pattern regarding the user. Furthermore, the device 100 may determine priorities of areas of the screen of the device 100 at which eyes of the user are frequently detected. The areas of the screen of the device 100 at which eyes of the user are frequently detected may include areas that may be easily viewed by the user. Furthermore, the device 100 may continuously track a sitting position of a user and generate preferred area information based on the sitting position of the user.

The device 100 may store information regarding a user's preferences regarding contents, information regarding recognized and non-recognized contents based on eyes of the user, information regarding areas at which eyes of the user are detected at high frequencies, and information regarding a sitting position of the user. Furthermore, the device 100 may transmit information regarding a user's preferences regarding contents, information regarding recognized and non-recognized contents based on eyes of the user, information regarding areas at which eyes of the user are detected at high frequencies, and information regarding a sitting position of the user to a server, such that the information may be stored in the server.

Furthermore, the device 100 may allocate priorities to areas of the screen of the device 100 based on preferred area information. Furthermore, the device 100 may determine locations for arranging contents based on priorities of the contents determined based on the information regarding the user's history of using contents.

Here, the selected content may refer to content selected from among a plurality of existing contents and may include at least one content or all of the plurality of contents.

In operation S630, the device 100 may rearrange the selected content and at least one new content at the determined locations on the screen of the device 100.

The device 100 may determine priorities of the selected content and the at least one new content. The device 100 may determine priorities of the contents based on information regarding the user's history of using contents, content property information, and user property information.

The device 100 may change at least some of a plurality of contents to new contents based on the determined priorities of the contents. The changed contents from among the plurality of contents may include contents having low priorities. For example, the device 100 may replace content having a low priority with new content, thereby displaying the new content. Therefore, the user may additionally check contents highly interested by the user.

The device 100 may remove at least some of the plurality of contents based on the determined priorities of the contents. The device 100 may change shapes of contents that are not removed and display the contents with changed shapes in a screen image without the removed contents. For example, the device 100 may remove contents having low priorities and display contents with high priorities with increased sizes.

Figure 7:
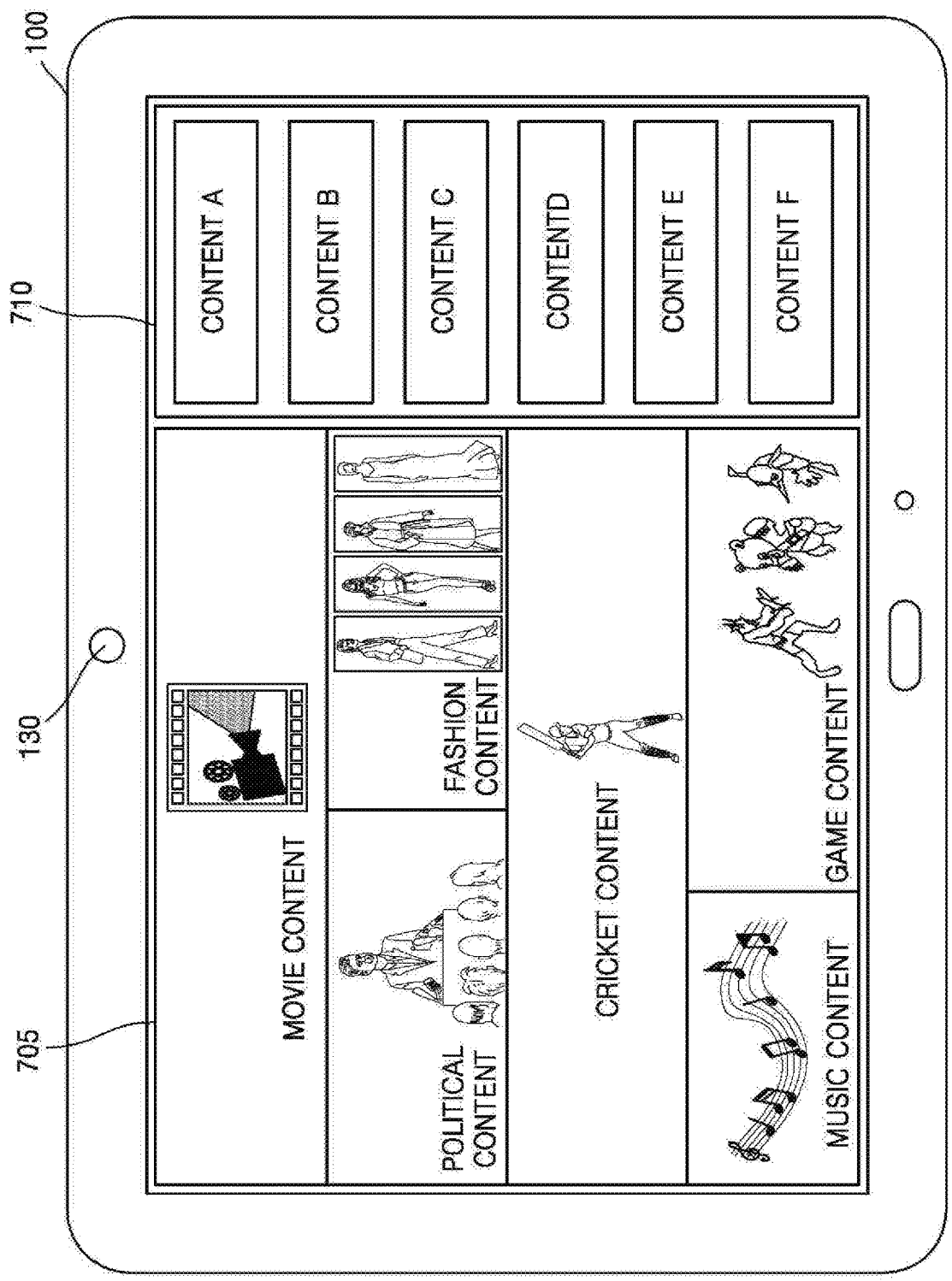
FIG. 7 is a diagram showing that new content is added according to various embodiments.

FIG. 7 is a diagram showing that new content is added according to various embodiments.

Referring to FIG. 7, the device 100 may add new contents in a display screen having displayed therein a plurality of contents.

The device 100 may display a plurality of contents (contents A to F) by adding a new window 710 in a screen image having displayed therein a window 705 including existing contents.

A plurality of contents included in the new window 710 may include contents related to the existing contents or may include new contents. However, various embodiments are not limited thereto.

For example, the device 100 may arrange movie content, which is content with a high priority, to be located in a preferred area having a high priority. The device 100 may additionally display contents A to F related to the movie content with a high priority. For example, the content A may include latest movie rankings, whereas the content B may include actors' interviews.

Alternatively, the device 100 may search for a history of a user regarding content priorities related to currently displayed contents in a storage or a server. The device 100 may add new content based on information regarding interests of the user regarding the currently displayed contents. Alternatively, the device 100 may rearrange the currently displayed contents based on information regarding interests of the user regarding the currently displayed contents.

The device 100 may suggest additional contents related to contents highly interested by the user according to priorities of the contents, thereby displaying contents that satisfy demands of the user.

Figure 8:
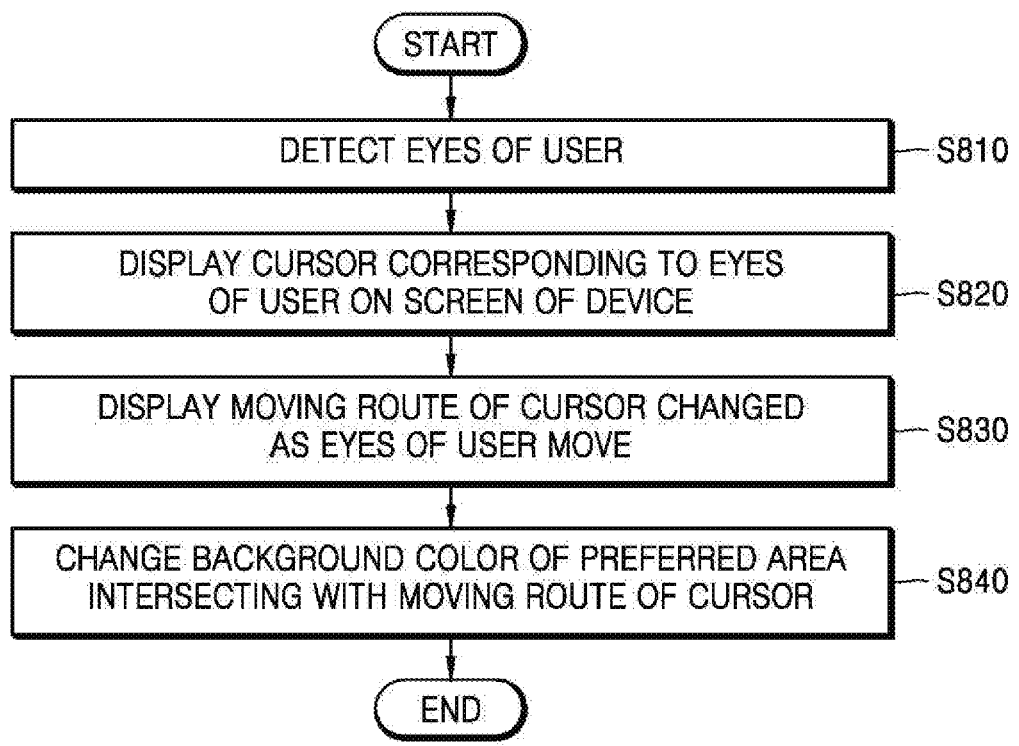
FIG. 8 is a flowchart showing operations of a device that detects eyes of a user according to various embodiments.

FIG. 8 is a flowchart showing operations of a device that detects eyes of a user according to various embodiments.

Referring to FIG. 8, in operation S810, the device 100 may detect eyes of a user.

Furthermore, the device 100 may analyze a viewpoint of the user and display eyes of the user on the screen of the device 100. Here, the viewpoint of the user may refer to an area of the screen of the device 100 viewed by eyes of the user. Furthermore, the device 100 may continuously track content at which eyes of the user is detected and an area of the screen of the device 100 viewed by the user. Furthermore, the device 100 may determine interests of the user regarding contents by monitoring time period elapsed to search for contents and face expressions and pupil expansions of the user during the time period. The device 100 may track distances between the screen of the device 100 and eyes of the user. Furthermore, the device 100 may detect a body position of the user viewing the device 100 based on the tracked distances in real time.

Furthermore, the device 100 may continuously track and analyze areas of the screen of the device 100 at which eyes of the user are detected while the user is browsing web pages. The device 100 may determine a route of viewpoints of the user. Therefore, the device 100 may generate preferred area information including priorities of areas that are frequently viewed by the user. Furthermore, the device 100 may store the preferred area information, the route of viewpoints of the user, and contents located on the route of the viewpoint.

In operation S820, the device 100 may display a cursor corresponding to eyes of the user on the screen of the device 100. The device 100 may display a viewpoint corresponding to eyes of the user on the screen of the device 100 as a cursor. Here, shape of the cursor is not limited. The cursor enables a user to recognize an area at which eyes of the user are located on the screen of the device 100.

According to various embodiments, the device 100 may display a signal from the user input via an input device, such as a mouse, instead of eyes of the user. Types of the input devices are not limited.

In operation S830, the device 100 may display a route of cursor movement that is changed as eyes of the user move.

The device 100 may prevent the cursor corresponding to eyes of the user from being removed even if eyes of the user move. In other words, the device 100 may display a route of cursor movement according to movement of eyes of the user by using dots, lines, or geometric shapes. However, various embodiments are not limited thereto.

As a route of cursor movement is displayed, the user may clearly recognize a direction in which eyes of the user move.

In operation S840, the device 100 may change a background color of a preferred area included in the route of cursor movement.

The device 100 may display contents intersecting with the route of cursor movement. The device 100 may determine that contents intersecting with the route of cursor movement are recognized by the user. The device 100 may change background colors of the contents recognized by the user, thereby distinguishing contents that are already read from contents that are not yet read.

According to various embodiments, the device 100 may not only a background of a preferred area included in the route of cursor movement, but also change a border color of the preferred area or shapes of contents. However, various embodiments are not limited thereto.

Figure 9A:
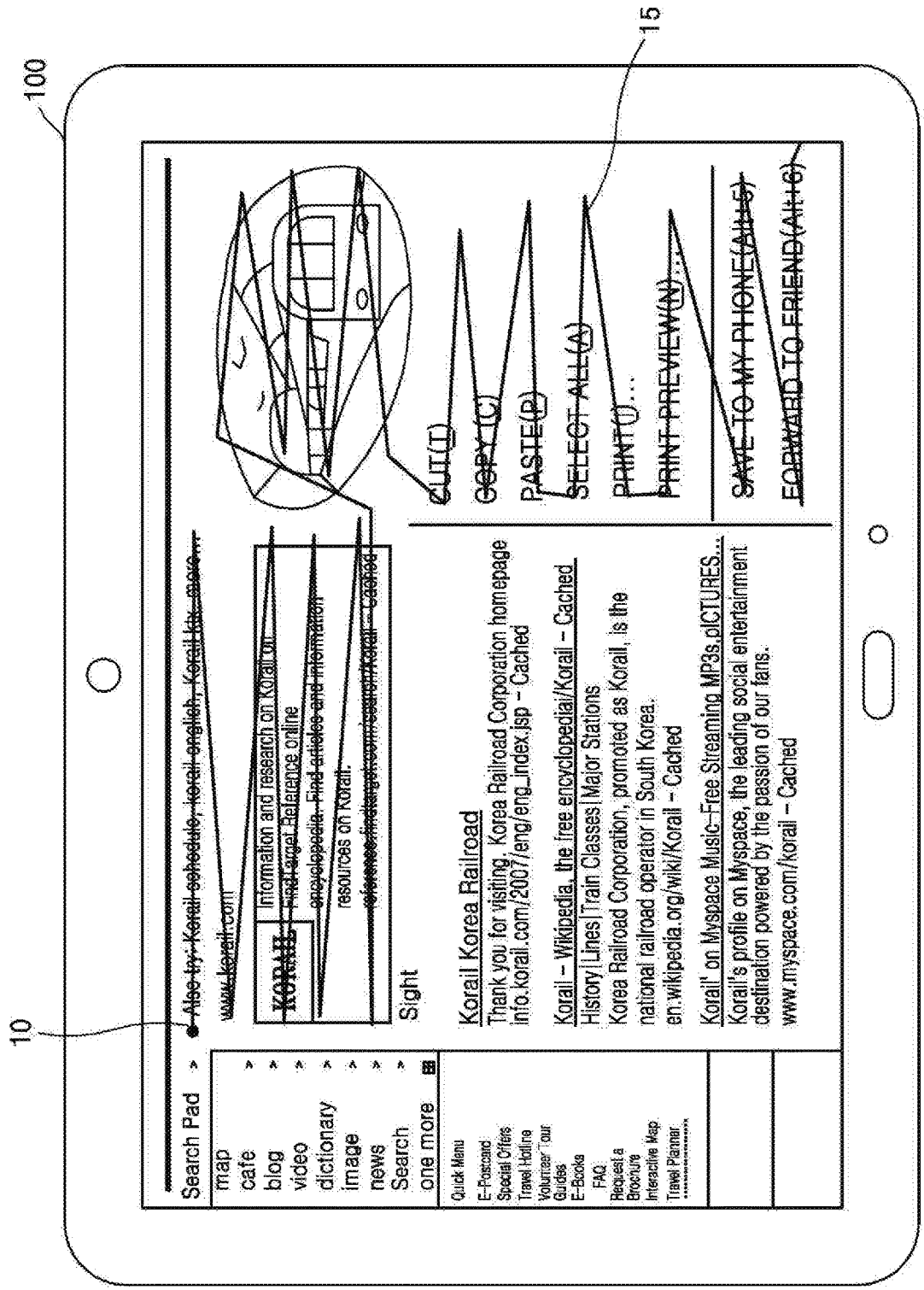
FIGS. 9A and 9B are diagrams showing that the device distinguishes contents recognized by a user by displaying a route of movement of eyes of the user according to various embodiments.
Figure 9B:
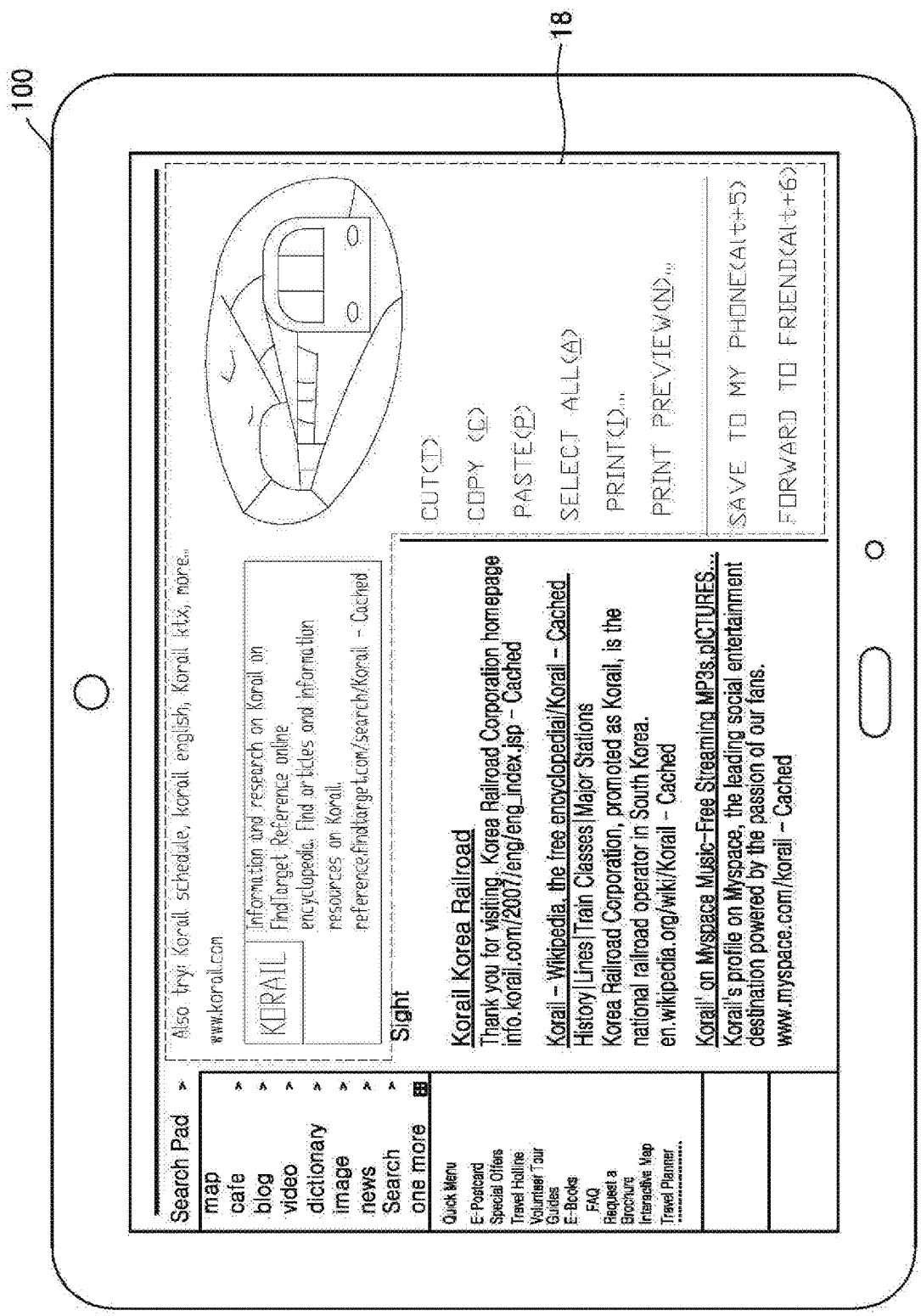

FIGS. 9A and 9B are diagrams showing that the device 100 distinguishes contents recognized by a user by displaying a route of movement of eyes of the user, according to various embodiments.

Referring to FIG. 9A, the device 100 may display a viewpoint 10 corresponding to eyes of a user on the screen of the device 100. Here, the device 100 may display contents rearranged based on preferred area information and priorities of data. However, in FIGS. 9A and 9B, arrangements of contents are not limited.

As shown in FIG. 9A, the device 100 may display a moving route 15 of the viewpoint 10 that moves as eyes of a user move by using at least one line. The device 100 may determine contents intersecting with the moving route 15 of the viewpoint 10 as contents read by eyes of the user. Furthermore, the device 100 may use the contents read by eyes of the user as information for determining priorities of contents. Furthermore, the device 100 may generate and store information regarding the moving route 15 of the viewpoint 10. Furthermore, the device 100 may map the moving route 15 of the viewpoint 10 to the contents intersecting with the moving route 15 and store a mapping result.

FIG. 9B is a diagram showing contents determined by the device 100 as contents read by eyes of a user based on an analysis of eyes of the user, where the contents read by eyes of the user are distinguished from other contents.

Referring to FIG. 9B, the device 100 may change background colors of contents intersecting with the moving route 15 of the viewpoint 10. For example, the device 100 may shade contents 18 determined as contents read by eyes of the user with a pre-set color. The process for the device 100 to shade contents 18 read by eyes of the user with a pre-set color may be referred to as a content shading process. Furthermore, the device 100 may remove shaded contents 18 from the screen of the device 100. Furthermore, the device 100 may replace shaded contents 18 with new contents. Here, the new contents may include contents related to contents read out by eyes of the user.

According to various embodiments, the device 100 may analyze eyes of the user and dynamically arrange contents in correspondence to eyes of the user. Furthermore, the device 100 may display contents read out by eyes of the user differently from the other contents from among arranged contents, thereby enabling the user to easily distinguish contents.

Figure 10:
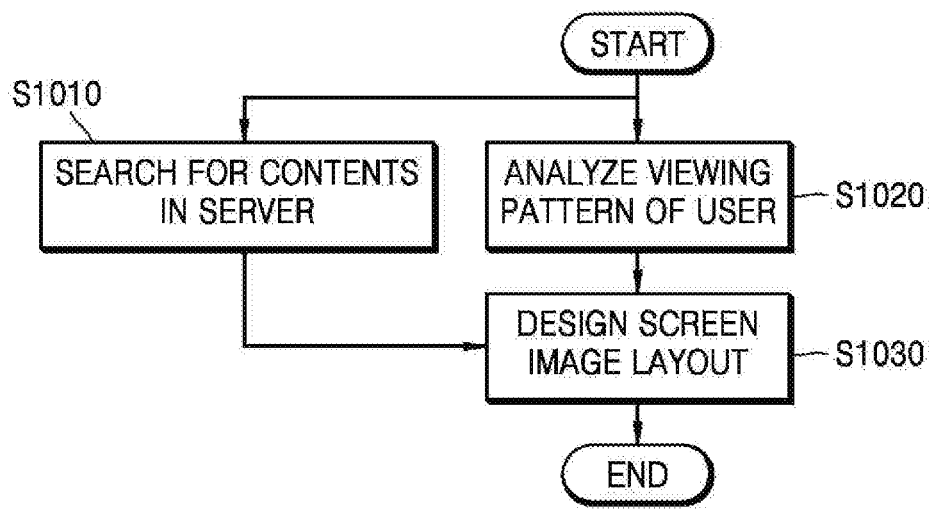
FIG. 10 is a flowchart showing a method of rearranging contents on a web browser screen image according to various embodiments.
Figure 11:
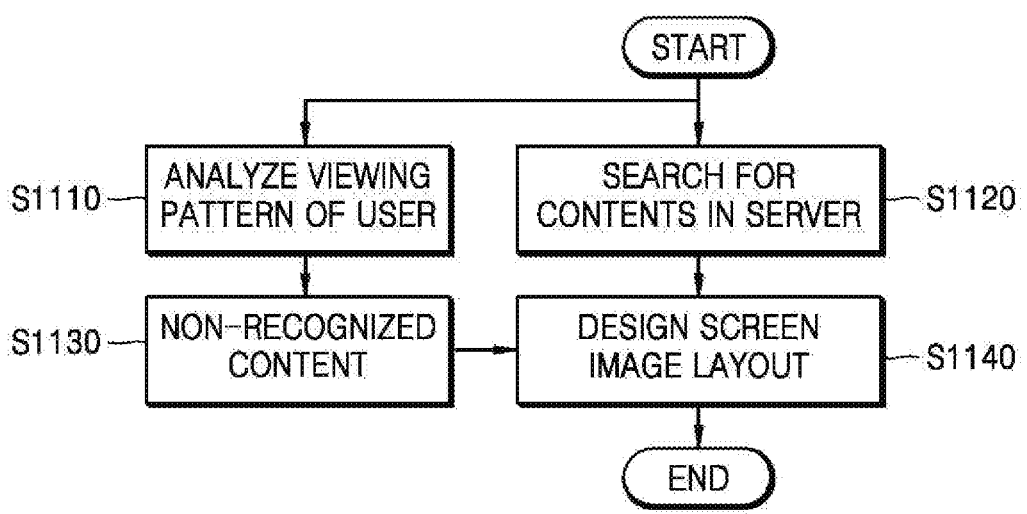
FIG. 11 is a flowchart showing a method of rearranging contents in a web browser that performs a real time processing according to various embodiments.
Figure 12:
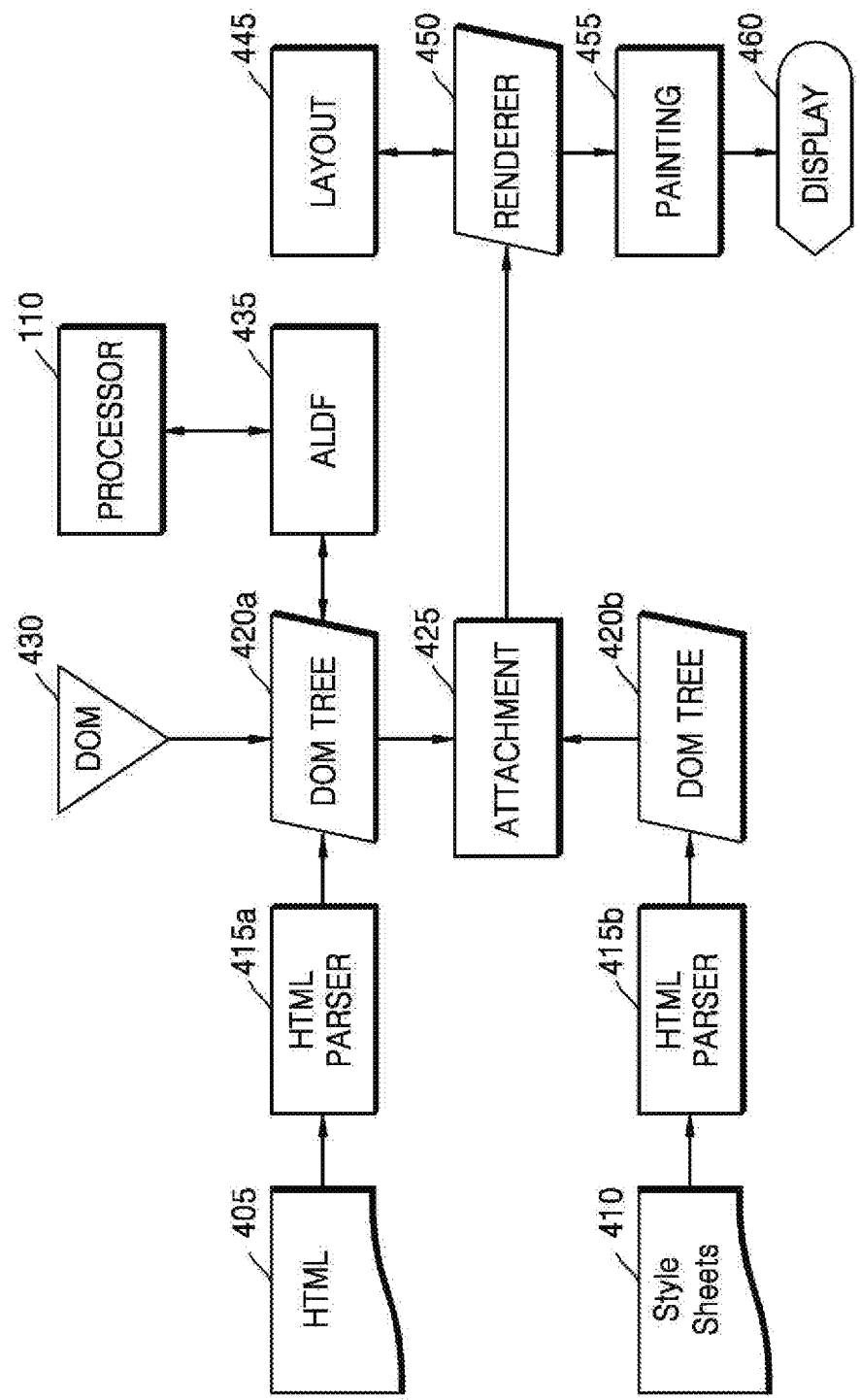
FIG. 12 is a block diagram showing components for rearranging contents in a web page in a web browser according to various embodiments.

Hereinafter, FIGS. 10 to 12 are diagrams showing examples that the device 100 displaying web pages rearranges contents on the screen of the device 100 according to various embodiments.

FIG. 10 is a flowchart showing a method of rearranging contents on a web browser screen image according to various embodiments.

In detail, FIG. 10 is a flowchart showing a method of rearranging contents in a web browser having pre-processed information regarding a user's viewing behavior.

Referring to FIG. 10, a web browser may include application programs used for searching for information on the internet and may also be referred to as a browser or an internet browser. By using a web browser, users may perform various activities, such as watching movies, exchanging e-mails, uploading/downloading various data, etc. General functions of a web browser include opening a web page, providing a recently visited internet address (uniform resource locator (URL)) and favorite links, and storing a web page, but are not limited thereto.

Contents may be displayed on a screen image displayed on the screen of the device 100 of the device 100, such as a background screen image, a home screen image, or a lock screen image. Furthermore, contents may be displayed in a window displayed on the screen of the device 100. For example, contents may be displayed in a web page displayed in a web browser. For example, contents may be displayed in a portion of or an entire layout defined in a web page.

Examples of contents are not limited to texts and may also include icons, images, video files, audio files, interactive applications, widgets, and interactive texts. However, examples of contents are not limited thereto.

In operation S1010, the device 100 may analyze a viewing pattern of a user. A viewing pattern of a user may be a pattern indicating when, where, at which body position, and how the user viewed a screen image. For example, a viewing pattern of a user may include a moving route of viewpoints that are viewed by eyes of the user and move as eyes of the user move. Information regarding a viewing pattern of a user may include information regarding a user's interests regarding contents, information regarding recognized and non-recognized contents based on eyes of the user, information regarding areas that may be easily viewed by the user, information regarding areas at which eyes of the user are detected at the highest frequency, and information regarding a sitting position of the user.

In operation S1020, the device 100 may search for contents in a server. Here, the server may be a server that provides contents to a web page displayed on the device 100. The server may store contents based on priorities of contents regarding a user. Furthermore, the server may recommend contents to the device 100 based on the priorities of contents.

In operation S1030, the device 100 may design a screen image layout. The device 100 may design a screen image layout to rearrange contents. Designing a screen image layout may refer to changing locations, shapes, and background colors of contents displayed on the screen of the device 100. For example, to rearranged contents displayed in a particular window, layout of the window may be changed.

The device 100 may rearrange contents on the screen of the device 100 in consideration of the viewing pattern of the user and the priorities of the contents displayed on the screen of the device 100. The device 100 may rearrange contents in real time. The device 100 may dynamically generate a web page layout according to eyes of the user. The device 100 may arrange a plurality of contents at the generated web page layout.

FIG. 11 is a flowchart showing a method of rearranging contents in a web browser that performs a real time processing according to various embodiments.

Referring to FIG. 11, in operation S1110, the device 100 may analyze a viewing pattern of a user. Information regarding the viewing pattern of the user may include a moving route of viewpoints that are move on the screen of the device 100 as eyes of the user move. The information regarding the viewing pattern of a user may include information regarding a user's interests regarding a plurality of contents, information regarding recognized and non-recognized contents from among the plurality of contents, information regarding areas that may be easily viewed by the user, information regarding areas at which eyes of the user are detected at the highest frequency, and information regarding a sitting position of the user while the user is browsing web pages in a web browser.

In operation S1120, the device 100 may search for a plurality of contents in a server. Examples of contents are not limited to texts and may also include icons, images, video files, audio files, interactive applications, widgets, and interactive texts. However, examples of contents are not limited thereto.

The device 100 may receive contents to be displayed on the screen of the device 100 from the server. The device 100 may receive recommendations of new contents to be displayed on the screen of the device 100. Furthermore, the device 100 may receive new contents to be displayed on the screen of the device 100 from the server.

In operation S1130, the device 100 may search for non-recognized contents. Non-recognized contents may refer to contents not viewed by eyes of the user. Furthermore, non-recognized contents may include contents not read by the user.

The device 100 may search for non-recognized contents to distinguish contents read by the user from contents not read by the user.

In operation S1140, the device 100 may design a screen image layout. The device 100 may design a screen image layout based on information regarding the user's interests regarding a contents, information regarding recognized and non-recognized contents from among the contents, information regarding areas that may be easily viewed by the user, information regarding areas at which eyes of the user are detected at the highest frequency, and information regarding a sitting position of the user while the user is browsing web pages in a web browser. In other words, the device 100 may dynamically generate a web page layout based on a sitting position and eyes of the user.

The device 100 may rearrange contents in the generated layout. The device 100 may rearrange contents based on priorities of the contents.

For example, according to various embodiments, the device 100 may rearrange contents according to priorities of preferred areas on the screen of the device 100. For example, contents read by the user may be moved to a preferred area having a low priority.

The device 100 may change at least one of locations of the contents, a direction in which the contents are displayed, displayed sizes of the contents, colors of the contents, font sizes of texts included in the plurality of contents, colors of the texts according to a sitting position of the user. Furthermore, the device 100 may change at least one of font sizes and colors of the plurality of contents based on a distance between the screen of the device 100 and the face of the user. According to various embodiments, the device 100 may change contents based on at least one of a sitting position and interests of the user.

Furthermore, the device 100 may display content determine to have the highest priority on a preferred area determine to have the highest priority based on eyes of the user. Therefore, the user may primarily recognize highly preferred contents.

FIG. 12 is a block diagram showing components for rearranging contents in a web page in a web browser according to various embodiments. The components shown in FIG. 12 may be components included in the device 100.

Referring to FIG. 12, to display a web page on the screen of the device 100, a web browser of the device 100 may generate a web page from a hypertext mark-up language (HTML) file 405 and a plurality of contents. A first HTML parser 415*a* may change the HTML file 405 and configure a first document object model (DOM) tree 420*a*. A DOM 430 may refer to an object presentation of the HTML file 405. The DOM 430 may be modified by a processor 110.

The processor 110 may continuously track and analyze areas of a display screen that are focused by a user while the user is browsing web pages. The processor 110 may determine viewing patterns of the user. Therefore, the processor 110 may determine areas of the display screen viewed by the user. Furthermore, the processor 110 may determine areas of display screen that are likely be viewed by the user. The areas of display screen that are likely be viewed by the user may include areas that may be easily viewed by the user.

Furthermore, the processor 110 may continuously track a sitting position of the user. The processor 110 may transmit Information regarding the user's interests regarding a contents, information regarding recognized and non-recognized contents from among the contents, information regarding areas that may be easily viewed by the user, and information regarding a sitting position of the user to an adaptive layout design module (ALDM) 435.

The ALDM 435 may interact with the processor 110 and transmit information in real time. The processor 110 may change the first DOM tree 420a while the first DOM tree 420a is being configured to display first content, according to priorities of preferred areas. Here, the first content may include content having the highest priority, but is not limited thereto.

To form a changed layout of the first DOM tree 420a, the ALDM 435 checks node elements in the first DOM tree 420a for displaying contents on a preferred area. According to various embodiments, second content having a low priority may be located in a preferred area having the highest priority. In this case, the ALDM 435 may change the first DOM tree 420a and replace the second content with the first content. Furthermore, the ALDM 435 may move the second content to a preferred area having a low priority.

A style sheet 410 may store information regarding an appearance of a current web page.

A second HTML parser 415b may change the style sheet 410 and obtain a second DOM tree 420b.

Simultaneously as the HTML parsers 415a and 415b configure the DOM trees 420a and 420b, the web browser may configure a renderer 450.

The renderer 450 may be generated in a process referred to as an attachment 425. The renderer 450 may refer to a tree including a plurality of contents arranged according to a presentation sequence. The renderer 450 may be a visual presentation of a web page.

The device 100 may perform a layout process 445 for determining information regarding locations and sizes of a plurality of contents in a web page.

In a paint process 455, a plurality of contents may be arranged in a web page.

In a display process 460, a changed web page may be displayed on a display screen.

According to various embodiments, although not shown, the device 100 may include a URL ranking module.

The URL ranking module may include a browser history module, a categorizing module, an additional window module, a URL analyzing module, a URL data searching module, a content recommending module, and a rule module. The URL ranking module may sort URLs in an order between a plurality of contents in a web page based on interests of a user, priorities of contents, priorities of preferred areas, and pre-set rules. Here, data items in a web page may indicate URLs. Examples of data items in a web page indicating URLs include not only text data, but also images. URLs in a web page may indicate data locations in servers connected to a web browser via an internet. At data locations in servers, at least one of web pages, media files, images, executable program files, and contact information files may be stored.

The URL data searching module may check URLs in a web page. Furthermore, the URL data searching module may install URLs in a web page to the device 100 in advance. To install URLs in advance, the URL data searching module may perform three operations. First, the URL data searching module may access data stored in data locations indicated by the URLs. Second, the URL data searching module may search for generation dates of the data stored in the data locations indicated by the URLs. Third, the URL data searching module may search for metadata information related to the URLs. Here, examples of the metadata information regarding the URLs may include generation dates of the URLs, expiration times of the URLs, and authors of the data indicated by the URLs. The URL data searching module may transmit data indicated by a URL, generation dates, and metadata information regarding the URL to the URL analyzing module.

The URL analyzing module may search for history information regarding a user's interests on contents in the storage. The URL analyzing module may analyze data items indicating URLs in a web page. Furthermore, the URL analyzing module may determine the user's interests on the data items based on the history information regarding the user's interests. Furthermore, the URL analyzing module may analyze data stored at data locations indicated by URLs. Furthermore, the URL analyzing module may determine the user's interest on data stored at editor locations based on the history information regarding the user's interests. The URL analyzing module may analyze metadata information regarding the URLs. The URL analyzing module may determine the user's interests on the metadata related to the URLs. Furthermore, the URL analyzing module determines suitability levels regarding the URLs, where the suitability levels may be based on at least one of the user's interests on data items, the user's interests on data stored at data locations indicated by the URLs, generation dates of the data stored at the data locations, and the user's interests on metadata related to the URLs. The URL analyzing module may transmit information regarding suitability of the URLs to the categorizing module.

The categorizing module may operate in conjunction with the rule module to categorize URLs based on suitability of the URLs and pre-set rules. The pre-set rules may be stored in the rule module. The pre-set rules may provide guidelines for evaluating URLs according to a plurality of ranking parameters. Examples of the ranking parameters may include suitability of URLs, generation dates of data stored at data locations indicated by the URLs, and a user's interests on data items related to the URLs. According to various embodiments, the pre-set rules may be defined by a user. According to various embodiments, the pre-set rules may be integrated with a web browser.

According to various embodiments, the URL data searching module may access data in first and second web pages. The URL analyzing module may analyze the data in the first and second web pages. The URL analyzing module may allocate higher priority to a first URL than to a second URL. The URL analyzing module may transmit information regarding suitability of the first and second URLs to the categorizing module.

The categorizing module operates in conjunction with the rule module to determine priorities of the first URL and the second URL based on suitability of the URLs and pre-set rules. The pre-set rules may provide a guideline for evaluating the first and second URLs based on the order that suitability levels of the first and second URLs decrease. For example, the categorizing module may allocate higher priority to the first URL than to the second URL.

According to various embodiments, the pre-set rules may be defined at the beginning of a web page in a web browser. Furthermore, weight levels may be defined in ranking parameters. The weight levels of the ranking parameters may indicate effects of the ranking parameters for determining priorities of URLs. According to various embodiments, the weight levels may be defined by a user. According to various embodiments, the weight levels may be provided by a web browser. According to various embodiments, the weight levels may be defined at the beginning of a web page in a web browser.

The categorizing module may transmit information regarding rankings of URLs to the content recommending module and the ALDM 435.

Furthermore, the content recommending module may have a blocking ranking regarding URLs. The content recommending module may select first, second, and third URL sets according to pre-set rules in the rule module. The content recommending module may select a user's priorities regarding selection of URLs. The content recommending module may select a first URL set from the beginning of a web page in a web browser. Furthermore, the content recommending module may select a second URL set from a first web page stated in a browsing history module. Furthermore, the content recommending module may select a third URL set from a second web page stated as a URL at the beginning of a web page in a web browser. The content recommending module may transmit information regarding the first, second, and third URL sets to the additional window module.

The additional window module may initiate an additional window in a web browser and display the first, second, and third URL sets in the additional window. According to various embodiments, an additional window may be a dialog box of the web browser. According to various embodiments, an additional window may be a toolbar in the web browser. According to various embodiments, the additional window module may integrate an additional window with a web page in the web browser. According to various embodiments, the additional window module may display an additional window at a preferred area having a low priority in a web page in a web browser. According to various embodiments, a user may set to not to initiate an additional window.

To conclude, the device 100 may adjust and change a web page layout based on eyes and a sitting position of a user. Therefore, the user may easily recognize a plurality of contents.

According to various embodiments, at least one of locations of the contents, a direction in which the contents are displayed, displayed sizes of the contents, colors of the contents, font sizes of texts included in the contents, colors of the texts, etc. may be changed according to a sitting position of a user. According to various embodiments, the device 100 may change at least one of font sizes and colors of the plurality of contents based on a distance between the screen of the device 100 and the face of the user.

Figure 13:
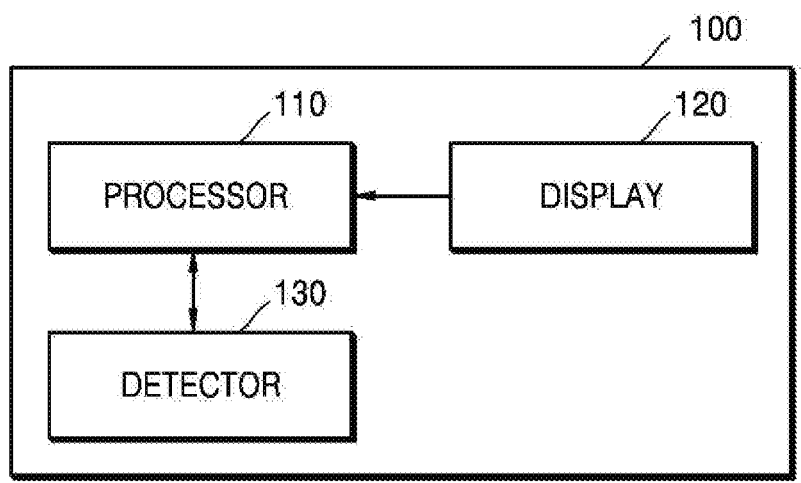
FIGS. 13 and 14 are functional block diagrams showing configurations of the device according to various embodiments.
Figure 14:
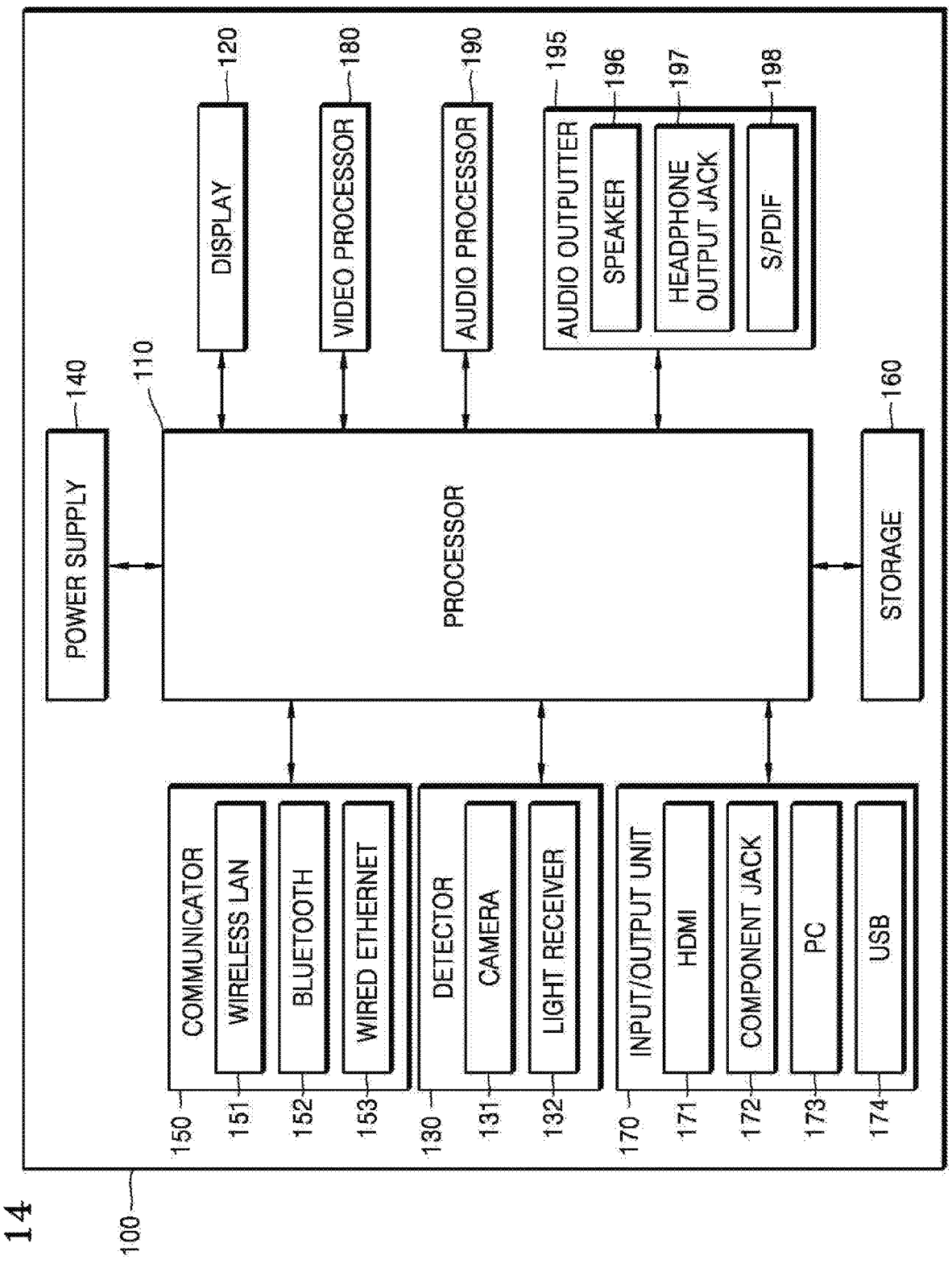

FIGS. 13 and 14 are functional block diagrams showing configurations of the device 100 according to various embodiments.

Referring to FIG. 13, the device 100 may include a processor 110, a display 120, and a detector 130. However, not all of the components shown in FIG. 20 are necessary components of the device 100. The device 100 may be embodied with more components or less components than those shown in FIG. 20.

Referring to FIG. 14, the device 100 according to some embodiments may not only include a processor 110, a display 120, and a detector 130, but also include a power supply 140, a communicator 150, a storage 160, an input/output unit 170, a video processor 180, an audio processor 190, and an audio outputter 195.

The display 120 may convert image signals, data signals, on-screen display (OSD) signals, and control signals and generate driving signals. The display 120 may be embodied as a plasma display panel (PDP), a liquid crystal display (LCD), an organic light-emitting display (OLED), a flexibly display, or a three-dimensional (3D) display. Furthermore, the display 120 may be embodied as a touch screen. In this case, the display 120 may be used not only as an output device, but also as an input device.

According to various embodiments, the display 120 may display a plurality of contents. Furthermore, the display 120 may display a user's viewpoint set based on eyes of the user. Furthermore, the display 120 may display contents at a preferred area generated based on preferred area information that is set based on eyes of a user.

Based on detected eyes of a user, the processor 110 may generate preferred area information related to an preferred area preferred by a user in the entire screen of the device 100, select at least one of a plurality of contents, and change display locations of the selected content(s) based on the generated preferred area information, thereby rearranging the plurality of contents.

Furthermore, the processor 110 may select content to be recommended to a user based on the user's history of using contents.

Here, information regarding a history of using contents may include at least one of numbers of times that each user viewed respective contents, periods of times that each user viewed the respective contents, and frequencies of using the respective contents, each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents.

Furthermore, information regarding a history of using contents includes information regarding a face expression and a body position of a user while the user is viewing contents, and the processor 110 may select contents based on face expressions and body positions of a user viewing contents.

Furthermore, the processor 110 may select contents to be recommended to a user based on at least one of content property information regarding contents and user property information regarding a user and information regarding the user's history of using contents.

Furthermore, content property information may include information regarding types and genres of contents viewed by a user, and the processor 110 may select contents based on types and genres of contents viewed by the user.

Furthermore, user property information may include a user's authorization for using contents and a location of the user, and the processor 110 may select contents based on the user's authorization for using contents and a location of the user.

Preferred area information may include at least one of size, shape, location, and priority of a preferred area.

Furthermore, preferred area information may be generated based on at least one of a moving route of detected eyes of a user, a time period that eyes of the user are detected, and a number of times that eyes of the user are detected.

Furthermore, a preferred area may be set by a user.

Furthermore, the processor 110 may determine priorities of a plurality of contents displayed on the screen of the device 100, select content from among the plurality of contents based on preferred area information and the priorities of the plurality of contents, and change location of the selected content.

Furthermore, to change location of the selected content, the processor 110 may move the selected content to a preferred area and, if unselected content from among the plurality of content is located at the preferred area, may move the unselected content to an area of the screen of the device 100 other than the preferred area.

Furthermore, the processor 110 may remove at least some of unselected contents from among the plurality of contents.

Furthermore, the processor 110 may change shape of the selected content based on preferred area information.

Furthermore, the processor 110 may obtain at least one new content, determine locations for arranging selected content and the at least one new content based on preferred area information, and arrange the selected content and the at least one new content at the determined locations.

Furthermore, the processor 110 may determine priorities of a plurality of contents, replace at least some of the plurality of contents with new contents based on the determined priorities, and, if priority of content is lower than or equal to a pre-set ranking, replace the content lower having a priority than or equal to the pre-set ranking with new content.

Furthermore, the processor 110 may change a background color of a preferred area based on preferred area information.

The processor 110 may include an embedded electronic circuit for processing and function controlling of the device 100. Furthermore, the processor 110 may include a controlling module and a calculation module. The calculation module may perform mathematical and logical determinations. The controlling module may control the calculation module and the communicator 150.

The detector 130 may detect a relative location of a user with respect to the device 100. In detail, the detector 130 may capture an image of a user to detect a location of the user.

Furthermore, the detector 130 may detect eyes of a user based on at least one of expansion state of pupils of the user, a direction viewed by eyes of the user, existence of eyes of the user, and a retinal pattern of the user.

Furthermore, the detector 130 may display a cursor corresponding to eyes of a user on the screen of the device 100 and display a moving route of the cursor changed as eyes of the user move.

Furthermore, the detector 130 may change a background color of content intersecting with the moving route of the cursor.

Here, contents may include at least one of texts, hyperlinks, images, icons, user interfaces (UIs), audio files, video files, advertisements, and web page objects.

Referring to FIG. 14, the detector 130 may include a camera 131 and a light receiver 132.

The camera 131 may capture an image of a user within a camera recognition range. Furthermore, the camera 131 may receive an image corresponding to a motion of a user including a gesture within a camera recognition range. For example, a camera recognition range of the camera 131 may be a distance from about 0.1 m to about 5 m from the camera 131 to a user. A user's motion may include a motion of a body part or a part of the user, such as the face, a face expression, hands, fists, and fingers. The camera 131 may convert a received image to electric signals and output to the processor 110 under the control of the processor 110.

According to various embodiments, the camera 131 may capture an image of the face of a user including pupils of the user and output the photographed face image to the processor 110, so that the processor 110 may use the face image to recognize the pupils of the user viewing the device 100.

Furthermore, the camera 131 may include a plurality of camera modules. The processor 110 may activate at least any one of the plurality of camera modules included in the camera 131 based on a current shape of the device 100.

The camera 131 may analyze eyes of a user while the user is browsing web pages. According to an embodiment various embodiments, the camera 131 may include at least one of a web camera, a mobile phone camera, and a DSLR camera. The camera 131 may monitor a viewing pattern of a user by tracking a plurality of characteristics of the user's behaviors.

According to various embodiments, examples of the plurality of characteristics of a user's behaviors may include at least one of eyes of the user, face expressions, emotional states, existence of eyes, locations of eyes, eye-blinking rate, a retinal pattern, and pupil expansion, but are not limited thereto. Furthermore, the camera 131 may transmit information regarding a user's behaviors to the processor 110 and the storage 160.

Furthermore, the camera 131 may consist of a lens (not shown) and an image sensor (not shown). The camera 131 may support an optical zoom or a digital zoom by using a plurality of lenses and image processing techniques. A camera recognition range of the camera 131 may vary according to an angle of a camera and surrounding environments. If the camera 131 consists of a plurality of cameras, a 3D still image or a 3D motion may be received via the plurality of cameras.

The camera 131 may be integrated with or separated from the device 100. A separate device (not shown) including the separated camera 131 may be electrically connected to the device 100 via the communicator 150 or the input/output unit 170.

The power supply 140 may supply power input from an external power source to components inside the device 100, under the control of the processor 110. Furthermore, the power supply 140 may supply power output from one, two, or more batteries (not shown) located inside the device 100 to components inside the device 100, under the control of the processor 110.

The light receiver 132 may receive an optical signal corresponding to a user input (e.g., a touch, a push, a touch gesture, a voice, or a motion) with respect to the device 100. A control signal may be extracted from the received optical signal under the control of the processor 110.

The communicator 150 may connect the device 100 to an external device (e.g., an audio device) under the control of the processor 110. The processor 110 may transmit or receive a video to or from the external device connected via the communicator 150, download an application from the external device, or browse web pages via the communicator 150. The communicator 150 may include one of a wireless local area network (LAN) module 151, a Bluetooth module 152, and a wired Ethernet module 153 in correspondence to performance and structure of the device 100. Furthermore, the communicator 150 may include a combination of the wireless LAN module 151, the Bluetooth module 152, and the wired Ethernet module 153. The communicator 150 may receive a video control signal from the external device under the control of the processor 110. A control signal may be embodied as a Bluetooth type signal, a radio frequency (RF) type signal, or a Wi-Fi type signal.

The communicator 150 may further include other short-range wireless communication modules (e.g., a near field communication (NFC) module (not shown) or a Bluetooth low energy (BLE) module) other than the Bluetooth module 152.

Although not shown, the storage 160 may include a video receiving module, a display deformation detecting module, a volume control module, a voice recognizing module, a motion recognizing module, a light receiving module, a display control module, an audio control module, an external input control module, a power control module, a module for controlling power of a wirelessly connected external device (e.g., connected via Bluetooth), a voice database (DB), or a motion DB. The modules and databases of the storage 160 that are not shown may be embodied as software modules for performing a video reception control function, a volume control function, a communication control function, a voice recognition function, a motion recognition function, a light reception control function, a display control function, an audio control function, an external input control function, a power control function, or a function for controlling power of a wirelessly connected external device (e.g., connected via Bluetooth) at the device 100.

The storage 160 may store preferred area information determined based on eyes of a user and a moving route of a viewpoint that moves as eyes of the user move. The storage 160 may analyze movement of eyes of a user, map a moving route of eyes of the user to contents, and store a mapping result. The storage 160 may store priorities of contents and priorities of preferred areas.

The processor 110 may perform respective functions by using above-stated software modules stored in the storage 160.

The storage 160 may include both non-volatile media and volatile media. Furthermore, the storage 160 may include optical discs or magnetic disks. The volatile media may include dynamic memories.

The storage 160 may include a floppy disk, a flexible disk, a hard disk, a magnetic tape, or any of various other magnetic media; a compact disc read only memory (CD-ROM) or any of various other optical media; a punch card, a tape, or any of various other physical media having hole patterns; and a random access memory (RAM), a programmable ROM (PROM), an erasable and programmable ROM (EPROM), a flash-EPROM, or any of various other memory chips or cartridges.

The input/output unit 170 receives videos (e.g., moving pictures), audios (e.g., voices and music), and additional information (e.g., electronic program guides (EPGs)) from outside of the device 100 under the control of the processor 110. The input/output unit 170 may include one of a high-definition multimedia interface (HDMI) port 171, a component jack 172, a PC port 173, and a universal serial bus (USB) port 174. The input/output unit 170 may include a combination of the HDMI port 171, the component jack 172, the PC port 173, and the USB port 174.

One of ordinary skill in the art will easily understand that configurations and operations of the input/output unit 170 may vary according to various embodiments.

The video processor 180 may process video data rendered by the device 100. The video processor 180 may perform various image processing operations with respect to video data, such as decoding, scaling, noise filtering, frame rate conversion, and resolution conversion.

The audio processor 190 may process audio data. The audio processor 190 may perform various audio processing operations with respect to audio data, such as decoding, amplification, and noise filtering. Meanwhile, the audio processor 190 may include a plurality of audio processing modules for processing audios corresponding to a plurality of videos.

The audio outputter 195 may output an audio included in content under the control of the processor 110. The audio outputter 195 may output an audio (e.g., a voice, a sound, etc.) input via the communicator 150 and/or the input/output unit 170. Furthermore, the audio outputter 195 may output an audio stored in the storage 160 under the control of the processor 110. The audio outputter 195 may include at least one of a speaker 196, a headphone output jack 197, and a Sony/Philips digital interface (S/PDIF) output jack 198. The audio outputter 195 may include a combination of the speaker 196, the headphone output jack 197, and the S/PDIF output jack 198.

According to various embodiments, the device 100 may receive signals from external input device. For example, preferred area information may be input by a user via input device. Examples of the input devices may include a touch pad, a keyboard, a touch screen, an electronic pen, a microphone, and a camera, but are not limited thereto.

According to various embodiments, the device 100 may provide a remarkable effect of dynamically rearranging contents in a web page according to interests of a user. Furthermore, according to various embodiments, the device 100 may improve appearances of contents in a web page. Furthermore, various embodiments may reduce a possibility that a user omits relevant contents when the user searches for contents via a web page. Furthermore, various embodiments may reduce a possibility that contents highly preferred by a user is omitted when the user searches for contents via a web page. Furthermore, according to various embodiments, the device 100 may analyze a plurality of user-device interactions to analyze a user's behaviors. Examples of user-device interactions include not only eyes of a user, but also an eye-blinking rate, a face expression of the user, and an emotional state of the user. Since a plurality of user interactions are used to analyze the user's behaviors, precision of the analysis may be higher than an analysis based on eyes of a user only.

Furthermore, according to various embodiments, the device 100 may automatically search for new content in a server. Furthermore, various embodiments may provide an ergonomic support for a long time period while a user is searching for content. Furthermore, various embodiments may provide a cognitive support for a long time period while a user is searching for content. Furthermore, various embodiments may provide an adaptive support to handicapped people and help them to efficiently search for content.

According to various embodiments, the device 100 may change presentation of content according to a body position of a user. According to various embodiments, the device 100 may support an adaptive and dynamic web page layout design. Furthermore, according to various embodiments, the device 100 may enable a user to find a particular content in a web page.

According to various embodiments, may be implemented by a non-transitory computer-readable recording medium, such as a program module executed by a computer. The non-transitory computer-readable recording medium may be an arbitrary available medium accessible by a computer, and examples thereof include all volatile media (e.g., RAM) and non-volatile media (e.g., ROM) and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium.

While various embodiments have been shown and described, it will be understood by those skilled in the art that various changes in form and details may be made therein without departing from the spirit and scope of various embodiments as defined by the appended claims and their equivalents.

What is claimed is:

1. A method by which a device arranges contents displayed on a screen of the device, the method comprising:
   detecting a gaze of a user with respect to the screen of the device;
   generating preferred area information regarding a preferred area preferred by the user in an entirety of the screen of the device, based on the detected gaze of the user;
   determining priorities of a plurality of contents displayed on the screen of the device, wherein the determining of the priorities of the plurality of contents comprises determining a content having a high priority from among the plurality of contents based on at least one of a number of times of detection of the gaze of the user at the content, periods of times when the user gazes at the content, or a frequency of using the content being equal to or greater than a threshold;
   selecting at least one content, including the content having a high priority, from among the plurality of contents displayed on the screen of the device based on the determined priorities of the plurality of contents; and
   rearranging the plurality of contents displayed on the screen of the device by changing a displayed location of the selected at least one content, wherein the changing of the display location of the selected at least one content comprises moving a location of the content having a high priority to the preferred area based on the preferred area information.

2. The method of claim 1, wherein, in the selecting of the at least one content from among the plurality of contents, at least one of the plurality of contents to be recommended to the user is selected based on information regarding a history of the user of using the contents.

3. The method of claim 2, wherein the information regarding the history of the user of using the contents comprises at least one of a number of times that each user viewed respective contents, periods of time that each user viewed the respective contents, and frequencies of using the respective contents that each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents.

4. The method of claim 2,
   wherein the information regarding the history of the user of using the contents comprises information regarding a face expression and a body position of the user while the user is viewing contents, and
   wherein, in the selecting of the at least one content from among the plurality of contents, the at least one content is selected from among the plurality of contents based on a face expression and a body position of the user viewing contents.

5. The method of claim 1, wherein, in the selecting of the at least one content from among the plurality of contents, at least one of the plurality of contents to be recommended to the user is selected based on at least one of content property information regarding the content, user property information regarding the user, and information regarding a history of the user of using contents.

6. The method of claim 5,
   wherein the content property information comprises information regarding types and genres of contents viewed by the user, and
   wherein, in the selecting of the at least one content from among the plurality of contents, the at least one content is selected from among the plurality of contents based on types and genres of contents viewed by the user.

7. The method of claim 5,
   wherein the user property information comprises a user authorization regarding the contents and a location of the user, and
   wherein, in the selecting of the at least one content from among the plurality of contents, the at least one content is selected from among the plurality of contents based on an authorization by the user for using contents and the location of the user.

8. The method of claim 1, wherein the preferred area information comprises at least one of size, shape, location, and priority of the preferred area.

9. The method of claim 1, wherein the preferred area information is generated based on at least one of a moving route of the detected gaze of the user, a time period that the gaze of the user are detected, and a number of times that the gaze of the user are detected.

10. The method of claim 1, wherein the preferred area is set by the user.

11. The method of claim 1,
    wherein the rearranging of the plurality of contents comprises changing a location of the selected at least one content.

12. The method of claim 11,
    wherein, in the changing of the location of the selected at least content, the selected at least one content is moved to the preferred area, and
    wherein, if unselected content from among the plurality of contents is located in the preferred area, the unselected content is moved to an area of the screen of the device other than the preferred area.

13. The method of claim 1, wherein the rearranging of the plurality of contents comprises removing at least some of unselected contents from among the plurality of contents from the screen of the device.

14. The method of claim 1, wherein, in the rearranging of the plurality of contents, a display shape of the selected at least one content is changed based on the preferred area information.

15. The method of claim 1, wherein the rearranging of the plurality of contents further comprises:
obtaining at least one new content;
determining locations for arranging the selected content and the at least one new content based on the preferred area information; and
rearranging the selected content and the at least one new content at the determined locations.

16. The method of claim 15, wherein the rearranging of the plurality of contents further comprises:
replacing at least some of the plurality of contents with the at least one new content based on the determined priorities; and
if a priority of the content is lower than or equal to a pre-set ranking, replacing the content having a priority lower than or equal to the pre-set ranking with new content.

17. The method of claim 1, further comprising changing a background color of the preferred area based on the preferred area information.

18. The method of claim 1, wherein, in the detecting of the gaze of the user, the gaze of the user are detected based on at least one of an expansion state of pupils of the user, a direction viewed by the gaze of the user, existence of the gaze of the user, and a retinal pattern of the user.

19. The method of claim 1, wherein the detecting of the gaze of the user comprises:
displaying a cursor corresponding to the gaze of the user on the screen of the device; and
displaying a moving route of the cursor that is changed as the gaze of the user move.

20. The method of claim 19, further comprising changing a background color of content intersecting with the moving route of the cursor.

21. The method of claim 1, wherein each of the plurality of contents comprises at least one of texts, hyperlinks, images, icons, user interfaces (UIs), audio files, video files, advertisements, or web page objects.

22. A non-transitory computer readable recording medium having recorded thereon a computer program for, when executed by at least one processor, implementing the method of claim 1.

23. A device for arranging contents displayed on a screen of the device, the device comprising:
a detector configured to detect a gaze of a user with respect to the screen of the device;
a display configured to display a plurality of contents; and
a processor configured to:
generate preferred area information regarding a preferred area preferred by the user in an entirety of the screen of the device, based on the detected gaze of the user,
determine priorities of the plurality of contents displayed on the screen of the device and a content having a high priority from among the plurality of contents,
select at least one content, including the content having a high priority, from among the plurality of contents displayed on the screen of the device based on the determined priorities of the plurality of contents, and
rearrange the plurality of contents displayed on the screen of the device by changing a displayed location of the selected at least one content, wherein the changing of the display location of the selected at least one content comprises moving a location of the content having a high priority to the preferred area based on the preferred area information,
wherein, the processor is further configured to determine the content having a high priority from among the plurality of contents based on at least one of a number of times of detection of the gaze of the user at the selected content, periods of times when the user gazes at the selected content, or a frequency of using the selected content being equal to or greater than a threshold.

24. The device of claim 23, wherein the processor is further configured to select at least one of content from among the plurality of contents to be recommended to the user based on information regarding a history of the user of using the contents.

25. The device of claim 24, wherein the information regarding the history of the user of using the contents comprises at least one of a number of times that each user viewed respective contents, periods of time that each user viewed the respective contents, and frequencies of using the respective contents that each user used the respective contents, storage locations of the respective contents, time points that the respective contents are used, histories regarding completion or interruption of uses of the respective contents, reservations for using the respective contents, registration information of items of interest regarding the respective contents, and available time points for using the respective contents.

26. The device of claim 24,
wherein the information regarding the history of the user of using the contents comprises information regarding a face expression and a body position of the user while the user is viewing contents, and
wherein the processor is further configured to select at least one content from among the plurality of contents based on a face expression and a body position of the user viewing contents.

27. The device of claim 23, wherein the processor is further configured to select at least one content from among the plurality of contents to be recommended to the user based on at least one of content property information regarding the content, user property information regarding the user, and information regarding a history of the user of using contents.

28. The device of claim 27,
wherein the content property information comprises information regarding types and genres of contents viewed by the user, and
wherein, the processor is further configured to select the at least one of content from among the plurality of contents based on types and genres of contents viewed by the user.

29. The device of claim 27,
wherein the user property information comprises a user authorization regarding the contents and a location of the user, and
wherein the processor is further configured to select the at least one of content from among the plurality of contents based on an authorization by the user for using contents and the location of the user.

30. The device of claim 23, wherein the preferred area information comprises at least one of size, shape, location, and priority of the preferred area.

31. The device of claim 23, wherein the preferred area information is generated based on at least one of a moving route of the detected gaze of the user, a time period that the gaze of the user are detected, and a number of times that the gaze of the user are detected.

32. The device of claim 23, wherein the preferred area is set by the user.

33. The device of claim 23, wherein the processor is further configured to change a location of the selected at least one content.

34. The device of claim 33,
wherein, to change the location of the selected content, the processor is further configured to move the selected at least one content to the preferred area, and
wherein, if unselected content from among the plurality of contents is located in the preferred area, the processor is further configured to move the unselected content to an area of the screen of the device other than the preferred area.

35. The device of claim 23, wherein the processor is further configured to remove at least some of unselected contents from among the plurality of contents from the screen of the device.

36. The device of claim 23, wherein the processor is further configured to change display shape of the selected at least one content based on the preferred area information.

37. The device of claim 23, wherein the processor is further configured to:
obtain at least one new content,
determine locations for arranging the selected content and the at least one new content based on the preferred area information, and
rearrange the selected content and the at least one new content at the determined locations.

38. The device of claim 23, wherein the processor is further configured to:
replace at least some of the plurality of contents with at least one new content based on the determined priorities, and
if a priority of the content is lower than or equal to a pre-set ranking, replace the content having the priority lower than or equal to the pre-set ranking with new content.

39. The device of claim 23, wherein the processor is further configured to change a background color of the preferred area based on the preferred area information.

40. The device of claim 23, wherein the detector is configured to detect the gaze of the user based on at least one of an expansion state of pupils of the user, a direction viewed by the gaze of the user, existence of the gaze of the user, and a retinal pattern of the user.

41. The device of claim 23, wherein the processor is further configured to display a cursor corresponding to gaze of the user on the screen of the device and displays a moving route of the cursor that is changed as gaze of the user move.

42. The device of claim 41, wherein the processor is further configured to change a background color of content intersecting with the moving route of the cursor.

43. The device of claim 23, wherein each of the plurality of contents comprises at least one of texts, hyperlinks, images, icons, user interfaces (UIs), audio files, video files, advertisements, or web page objects.

* * * * *